United States Patent [19]

Eida et al.

[11] 4,295,889
[45] Oct. 20, 1981

[54] RECORDING LIQUID COMPOSITION

[75] Inventors: Tsuyoshi Eida, Chiba; Masahiro Haruta, Funabashi; Yasuhiro Yano; Yoji Matsufuji, both of Tokyo; Tokuya Ohta, Yokohama, all of Japan

[73] Assignee: Canon Kabushiki Kaisha, Tokyo, Japan

[21] Appl. No.: 97,920

[22] Filed: Nov. 28, 1979

[30] Foreign Application Priority Data

Dec. 1, 1978 [JP] Japan .................. 53-148679
Jun. 22, 1979 [JP] Japan .................. 54-78952
Jun. 22, 1979 [JP] Japan .................. 54-78953
Sep. 11, 1979 [JP] Japan .................. 54-116427

[51] Int. Cl.$^3$ ............................................. C09D 11/00
[52] U.S. Cl. ........................... 106/22; 260/145 A; 260/166
[58] Field of Search ............. 106/22; 260/145 A, 166

[56] References Cited

U.S. PATENT DOCUMENTS

| 1,943,727 | 1/1934 | Fleischhauer | 260/166 |
| 2,602,788 | 7/1952 | Anderau | 260/166 |
| 3,846,141 | 11/1974 | Ostergren et al. | 106/29 |
| 3,870,528 | 3/1975 | Edds et al. | 106/22 |
| 3,889,271 | 6/1975 | Freytag et al. | 106/22 |
| 4,141,889 | 2/1979 | Allan | 260/166 |
| 4,170,482 | 10/1979 | Mansukhani | 106/22 |

*Primary Examiner*—John Kight, III
*Assistant Examiner*—Amelia B. Yarbrough
*Attorney, Agent, or Firm*—Fitzpatrick, Cella, Harper & Scinto

[57] ABSTRACT

A recording liquid composition for use in a recording system of the type in which the recording liquid composition is jetted from a small orifice in a form of droplet flying toward a recording material on which an image is to be printed, said recording liquid composition comprising, as its recording agent component, a particular compound as well defined in the specification by the general formula (A) or (B).

30 Claims, 2 Drawing Figures

RECORDING LIQUID COMPOSITION

BACKGROUND OF THE INVENTION

1. Field of the Invention

The present invention relates to a recording liquid composition generally called ink for use in the so-called ink jet recording system.

2. Description of the Prior Art

Among various recording systems hitherto known in the art, non-impact recording system is comparable to impact recording system in simplicity. Moreover, the non-impact recording system has a particular advantage that the noise generated during recording is negligibly small. For this reason, all interests in the art are being focused on the non-impact recording system. Among others, the ink jet recording system has been found to be the most advantageous nonimpact recording system. It allows an especially high speed recording and also it enables to effect recording on a common paper sheet without any need of special fixing process.

Various improvements in the ink jet recording system have been proposed until now. Some of them have already been introduced successfully in the market and some are still under development.

In brief, the ink jet recording system is a recording system in which droplets of ink are jetted from a small orifice toward a recording material such as a paper sheet in a controlled manner and the jetted droplets of ink are adhered onto the recording material so as to record a desired image on it. In view of differences in the method of generating ink droplet, the method of controlling the flying direction of the ink droplet and the like, the ink jet recording system is classified into several types. Typical one is shown in FIG. 1 of the accompanying drawing. This system is of the type in which a recording signal is applied to a recording head part containing a piezo-oscillator and droplets of the recording liquid are generated to effect recording in response to the signal.

In FIG. 1, a recording head is designated by 1, a piezo-oscillator by 2a, an oscillating plate by 2b, an inlet of ink by 3, a liquid chamber in the head by 4 and a jet orifice by 5. Recording liquid 7 is introduced into the liquid chamber 4 from a storage tank 6 through a supply tube 8. In case of necessity, intermediate processing means 9 such as pump or filter may be provided in the supply tube 8. Recording signal S is converted into a pulse by signal processing means 10 such as a pulse converter and then applied to the piezo-oscillator 2a. Change in pressure on the recording liquid within the liquid chamber 4 caused by the signal results in droplets 11 of the recording liquid being jetted through the jet orifice 5. Thus, an image is printed on the surface of a recording material 12 with the droplets.

Another type of ink jet recording system is shown in FIG. 2 which comprises an liquid chamber 4 so shaped as to form a nozzle. A cylindrical piezo-oscillator 2a is provided surrounding the chamber 4. Mechanism for producing droplets of recording liquid in this apparatus is essentially the same as that in the apparatus shown in FIG. 1.

Although not shown in the drawing, there are also known those types of apparatus in which droplets of the recording liquid are continuously produced while electrifying the droplets to use a part of the droplets for recording or in which signals in a form of thermal energy are applied to the recording liquid in an liquid chamber provided within a recording head.

As previously described, according to the ink jet recording method, droplets of recording liquid composition, that is ink are jetted toward a recording material on which an image is to be recorded with the ink droplets. The ink used for this purpose is a composition composed essentially of a recording agent which is generally dye or pigment, and a liquid medium or carrier in which the recording agent is dissolved or dispersed. As the carrier, there is usually employed water or any suitable organic solvent or a mixture thereof. Various additives may be added to the composition as required.

As described above there are known various types of ink jet recording systems. One of the most important things common to all of the types is that the ink composition should have well-controlled values of physical properties such as viscosity, surface tension and specific resistance suitable for the droplet generating method and the direction controlling method of flying droplet then used. Another important requirement is that the ink composition should never form any solid matter even when some component of the recording composition is vaporized or the chemical composition of the ink is changed during a long storage period or during a rest time of recording operation. Since the jet orifice of the ink jet recording apparatus is extremely small (generally in the order of $10\mu$ in diameter), if solid is formed in the liquid ink composition, then it will lead to blocking of the orifice. In the worst case, the orifice becomes unable to jet ink droplet at all.

Even if such worst case is seldom, solids formed in the ink composition will inevitably disturb the uniformity of droplets and the stable flying of droplets, which will in turn reduce the recording ability, jet stability, jet responsiveness and continuous recording ability. Change in chemical composition of the ink brings forth change in physical characteristic values of the ink once adjusted to the desired values at the time of formulation. This may also have adverse effect on the recording ability, jet stability and jet responsiveness. Under the standard of the prior art there is an eager demand for such liquid carrier which is hardly evaporated and such recording agent which has a high chemical stability or such combination of recording agent and carrier which eliminates the above described disadvantages.

It is also required that the recorded image should have sufficiently high contrast and sharpness. In general, the known recording ink is apt to cause a trouble of blockage of the jet orifice when the concentration of the recording agent in the ink composition is increased to improve the contrast of the recorded image. Therefore, at present, such recording agent is being wanted which has a high solubility in liquid carrier as well as a high sharpness in tint.

Furthermore, the image once recorded has to have good water resistance, light resistance, weather resistance and abrasion resistance. However, the ink compositions, especially aqueous ones according to the prior art have the drawback that they easily get blurred on the recording material when wetted or they become faded by light or mechanical friction. Therefore, those skilled in the art have been longing to provide improved ink composition free of these drawbacks.

Many attempts have been made to improve the ink composition in the above mentioned respects. However, until now there has not yet been obtained such ink composition which can satisfy all of the requirements mentioned above and which is practically useful.

SUMMARY OF THE INVENTION

Accordingly, it is the general object of the invention to provide a recording liquid composition for use in the ink jet recording process which can satisfy all of the above-mentioned requirements.

More specifically, it is an object of the invention to provide a recording liquid composition which never brings forth the troubles of jet orifice blockage and change in quality or precipitation of components during storage and which is excellent in recording ability, jet stability and jet responsiveness.

It is another object of the invention to provide a recording liquid composition which allows an image to be recorded with good color tone and high contrast.

It is a further object of the invention to provide a recording liquid composition which enables to obtain those recorded images which are resisting to water, light, weather and abrasion and which has also a good fixability.

According to the present invention, there is provided a recording liquid composition for use in a recording system of the type in which the recording liquid composition is jetted from a small orifice in a form of droplet flying toward a recording material on which an image is to be printed, said recording liquid composition comprising, as its recording agent component, a compound of the general formula (A):

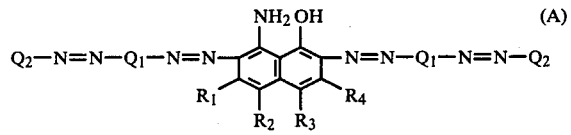

wherein
$Q_1$ and $Q_2$ each represents a benzene ring or naphthalene ring structure which may be unsubstituted or substituted by amino, hydroxyl or sulfo group;
$R_1$–$R_4$ each represents hydrogen or sulfo group; and the number of said sulfo groups present in one molecule is 2 to 8 in total and they are present in a form of sodium salt or quaternary ammonium salt, or a compound of the general formula (B):

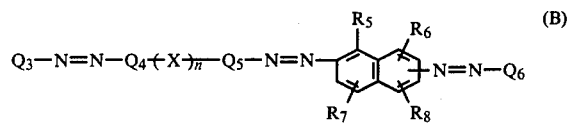

wherein
$Q_3$ and $Q_6$ each represents a substituted or unsubstituted phenyl or naphthyl group; $Q_4$ and $Q_5$ each represents a substituted or unsubstituted 1,4-phenylene or 1,4-naphthylene group;
$R_5$ and $R_6$ are selected from hydrogen, hydroxyl and amino group;
$R_7$ and $R_8$ each represents hydrogen atom or sulfo group in a form of sodium salt or quaternary ammonium salt; X is —NH—, —N=N— or —CH=CH— and
n is 0 or 1 provided that when n is 0, $Q_4$ and $Q_5$ are not unsubstituted 1,4-phnylene at the same time.

Other and further objects, features and advantages of the invention will apear more fully from the following detailed description.

DESCRIPTION OF THE PREFERRED EMBODIMENTS

Figure 1:
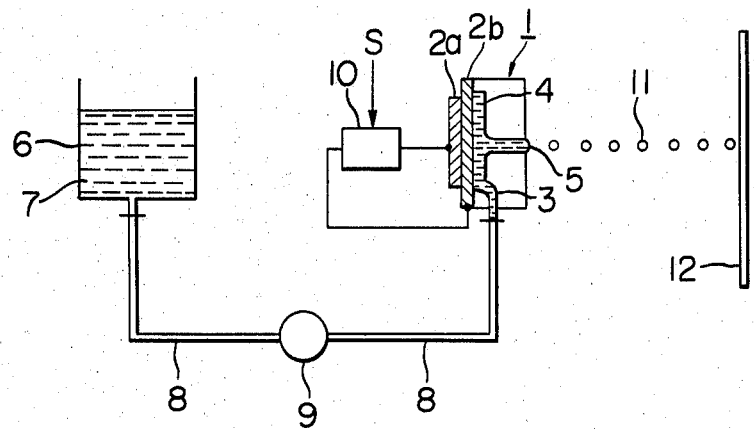
FIGS. 1 and 2 schematically show two typical examples of the ink jet recording apparatus to which the present invention is pertinent.

The recording liquid composition according to the present invention contains, as its recording agent component, a dye compound represented by the above general formula (A) or (B). The dye compound imparts to the recording liquid composition an improved recording ability such as higher jet stability, better jet responsiveness, improved continuous recording ability, etc. The recording liquid composition according to the invention affords sharp and clear image. The recording liquid composition is suitable for practical use in forming a recorded image having water resistance, light resistance, weather resistance and abrasion resistance.

The content of the dye compound (A) or (B) used in the invention may vary in a relatively wide range and can be suitably determined depending upon various factors such as the desire density of recorded image, type of the recording apparatus used, kind and amount of other ingredients added to the composition and the desired physical properties of the final liquid ink composition. However, generally speaking it is in the range of from 0.1 to 20 wt%, preferably from 0.5 to 15 wt% and most preferably from 1 to 10 wt% relative to the total weight of the prepared recording liquid composition.

Examples of the compound (A) or (B) are given below.

(I) Dye compounds of the general formula (A):

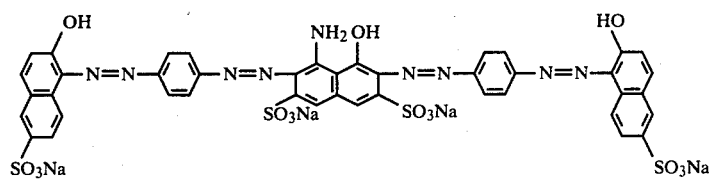

No. 1

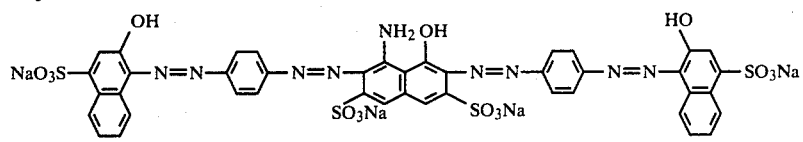

No. 2

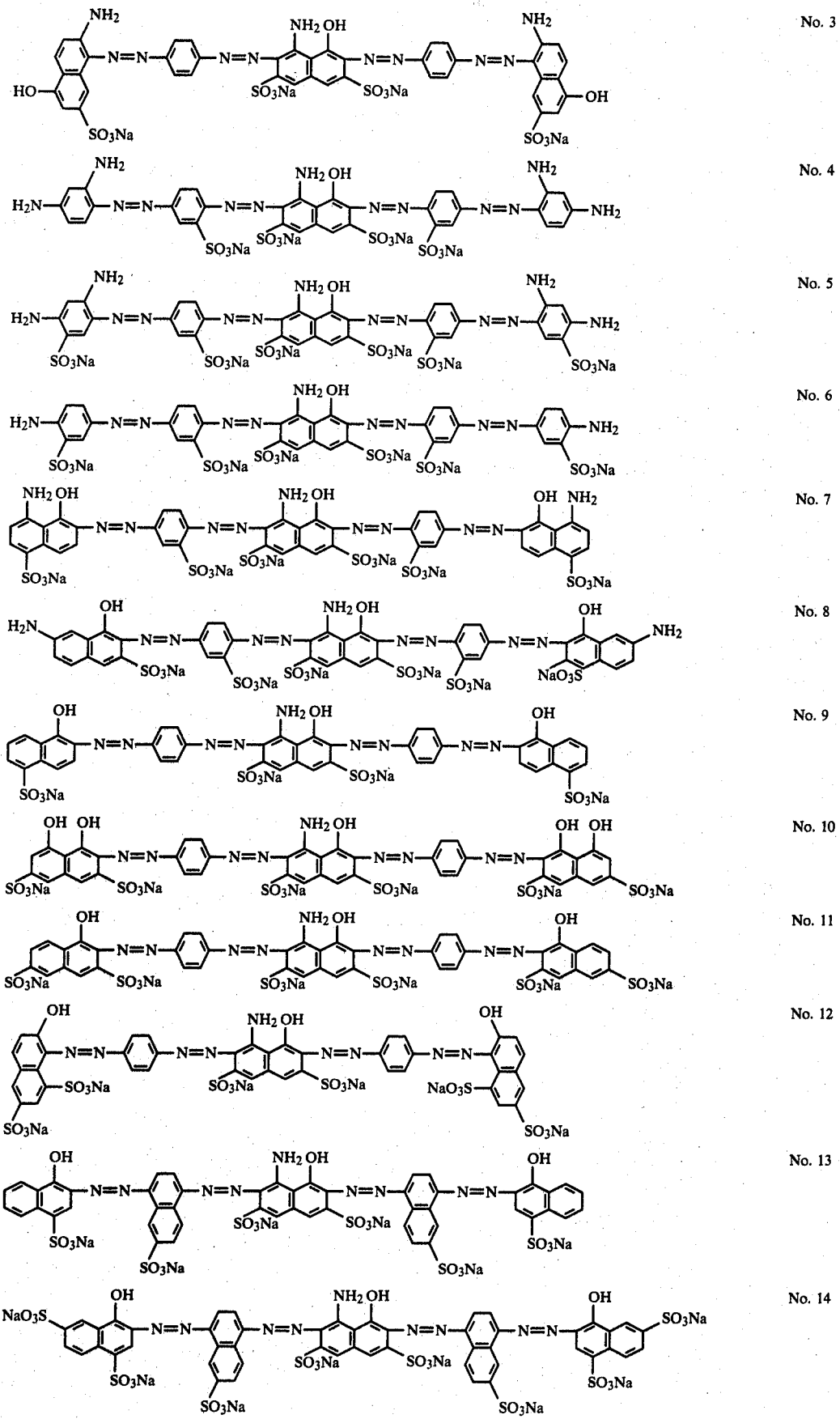

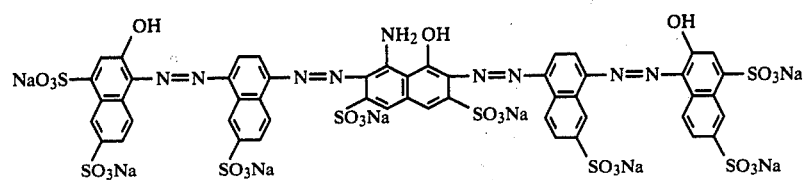
No. 15
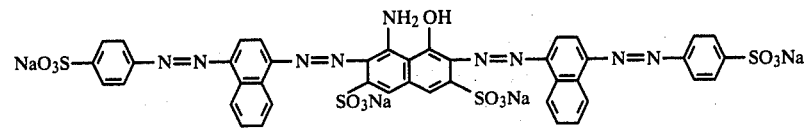
No. 16
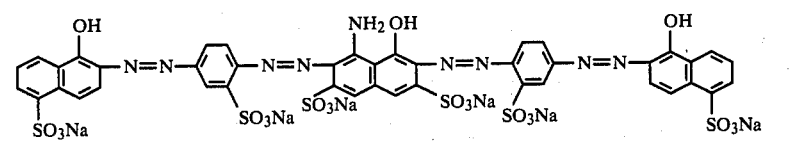
No. 17
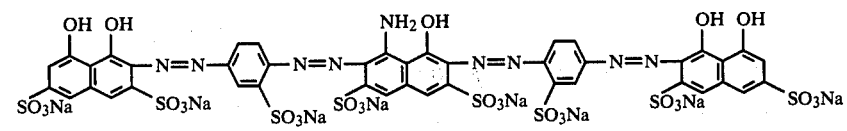
No. 18
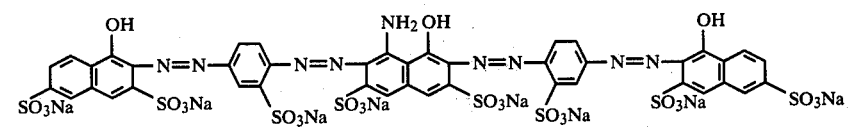
No. 19
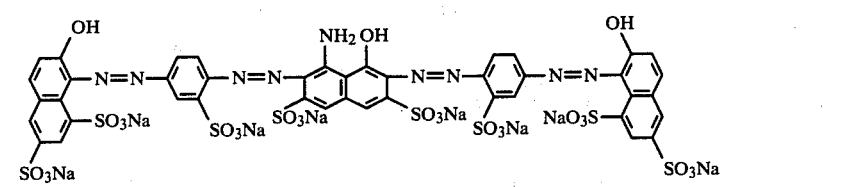
No. 20
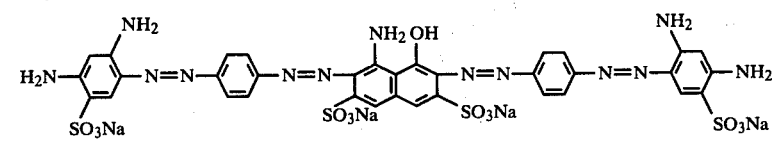
No. 21
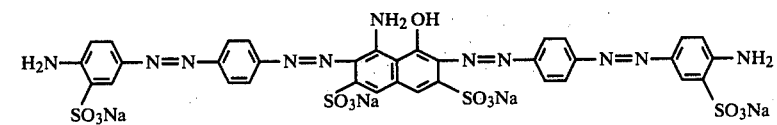
No. 22
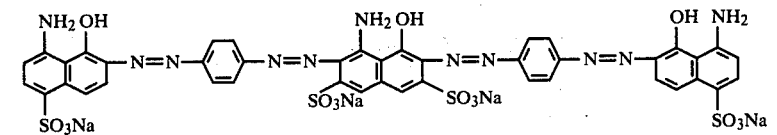
No. 23
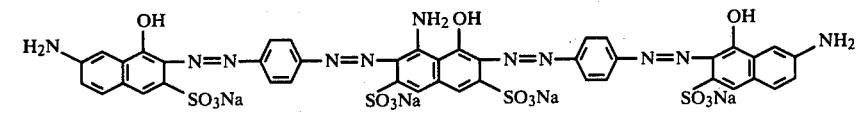
No. 24
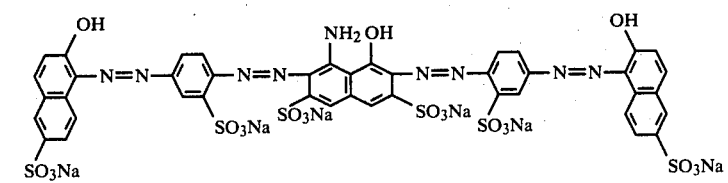
No. 25
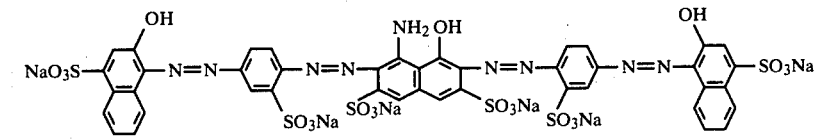
No. 26

-continued
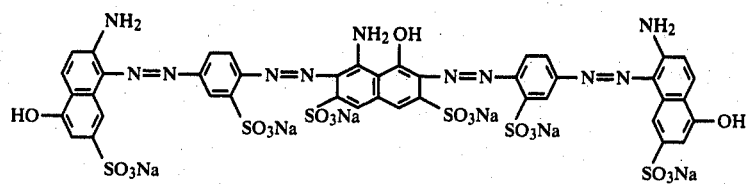 No. 27
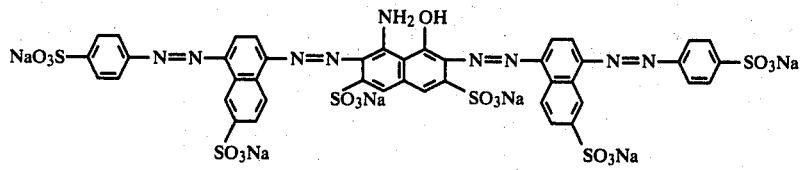 No. 28
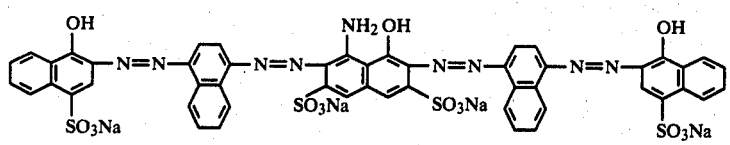 No. 29
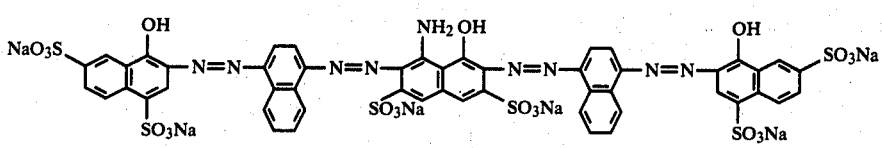 No. 30
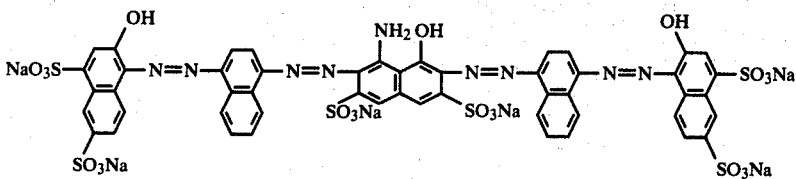 No. 31
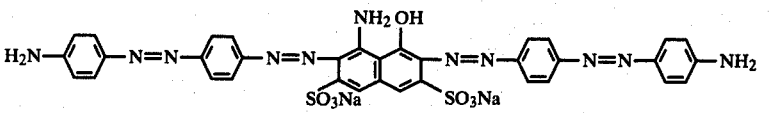 No. 32
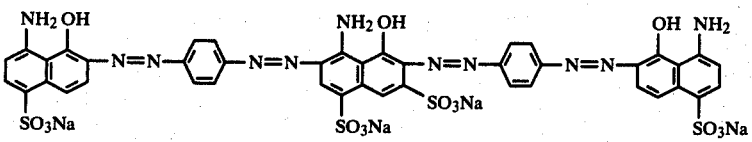 No. 33
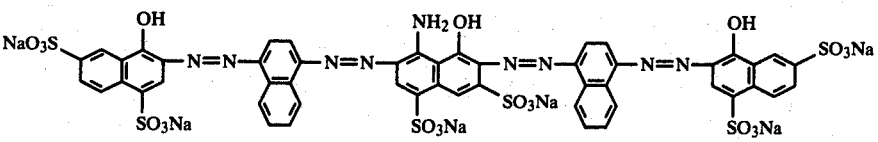 No. 34
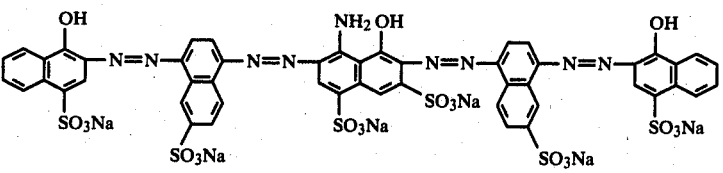 No. 35
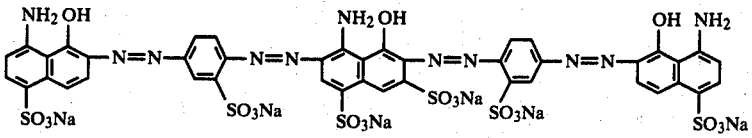 No. 36
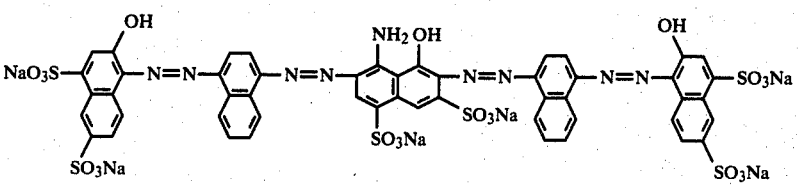 No. 37

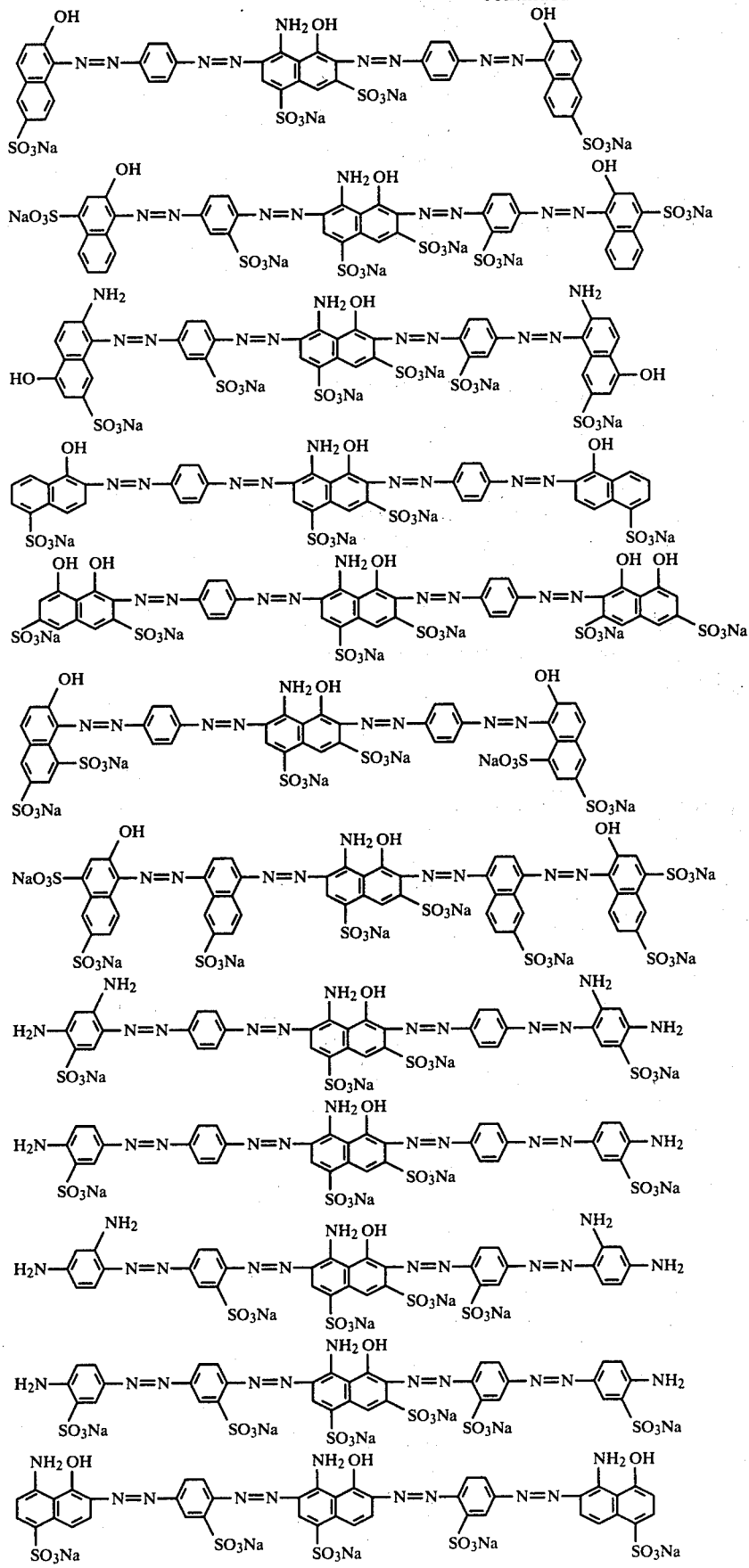

-continued
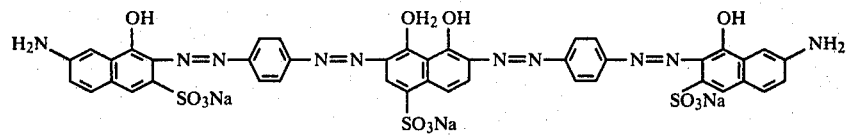
No. 50
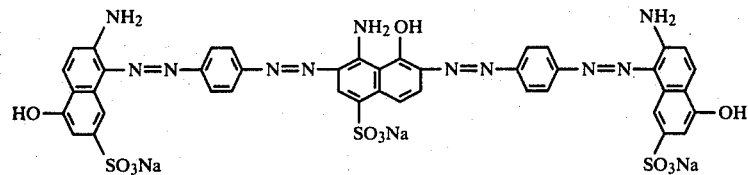
No. 51
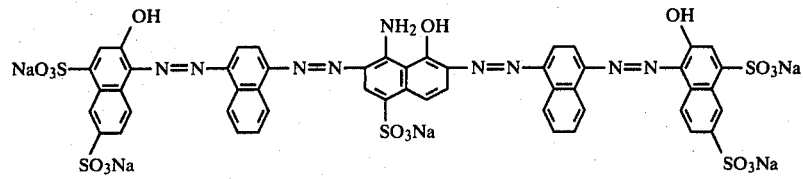
No. 52
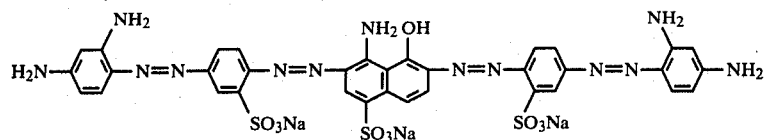
No. 53
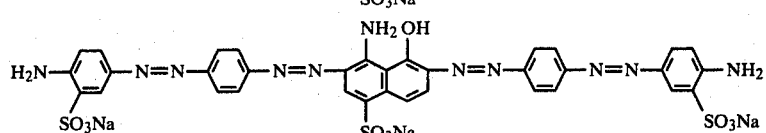
No. 54
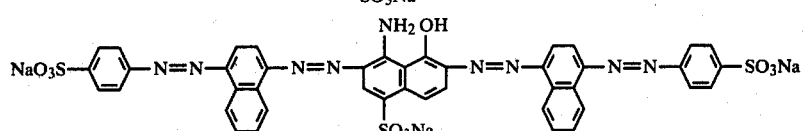
No. 55
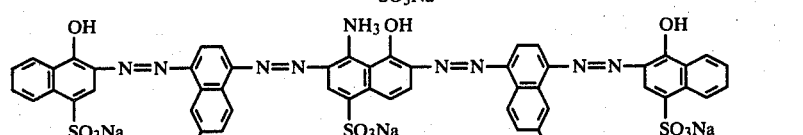
No. 56
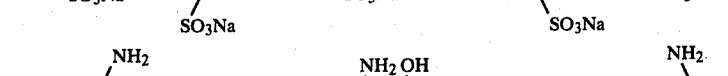
No. 57
R = —CH$_3$
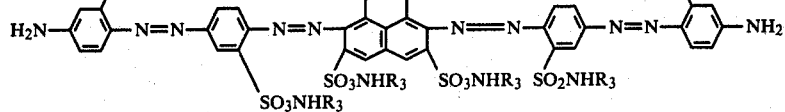
No. 58
R = —C$_2$H$_5$
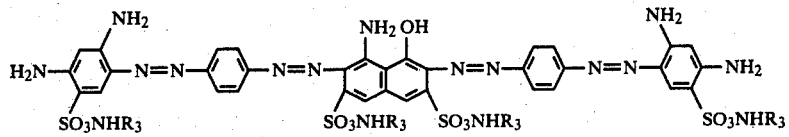
No. 59
R = —CH$_2$CH$_2$OH
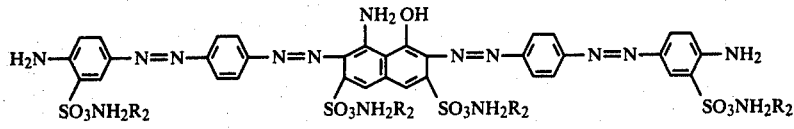
No. 60
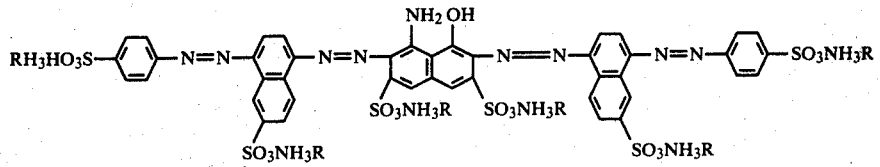
R = —CH$_3$ -continued
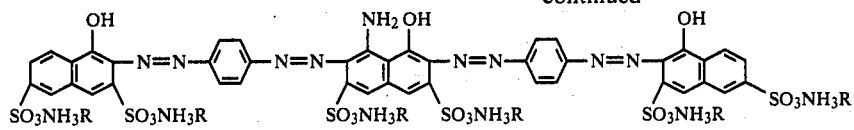
No. 61
R = —CH$_2$—[S]
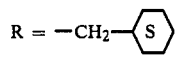
No. 62
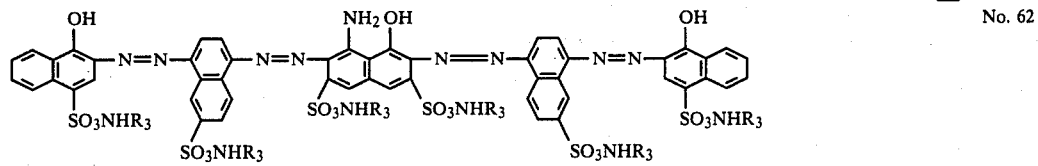
R = —CH$_3$
No. 63
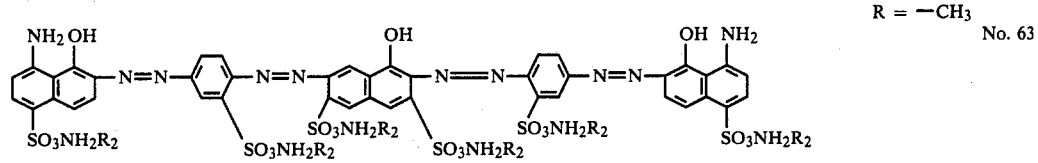
R = —(CH$_2$)$_3$CH$_3$
No. 64
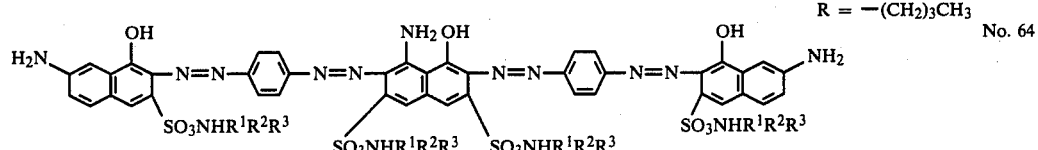
R$^1$ = —CH$_3$
R$^2$ = —CH$_2$CH$_3$
R$^3$ = —(CH$_2$)$_3$CH$_3$
No. 65
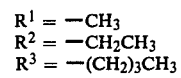
R = —(CH$_2$)$_5$CH$_3$
No. 66
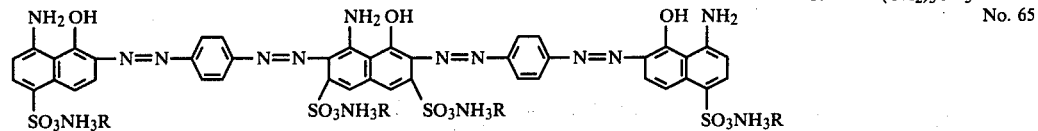
R = —CH$_2$CH$_2$OH
No. 67
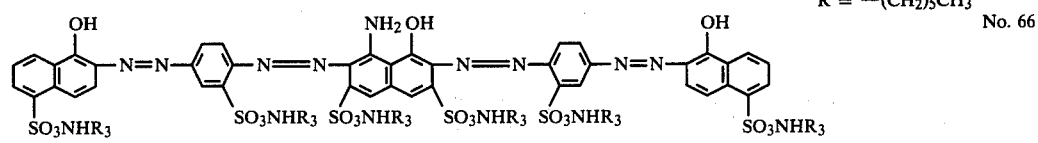
R = —CH$_2$CH$_3$
No. 68
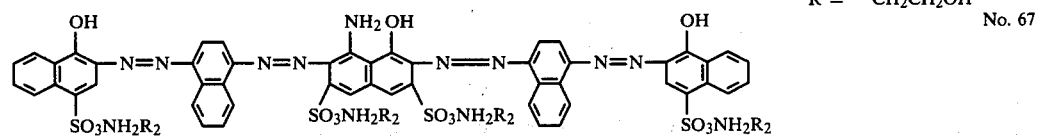
R$^1$ = —CH$_3$
R$^2$ = —CH$_2$CH$_3$
No. 69
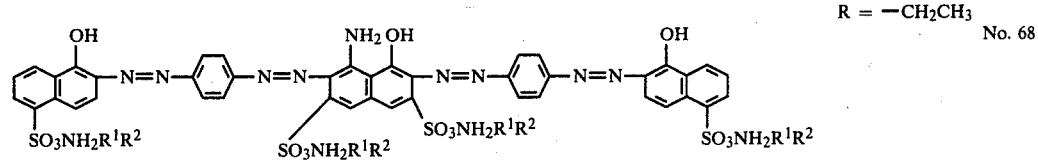
R = —(CH$_2$)$_3$CH$_3$
No. 70
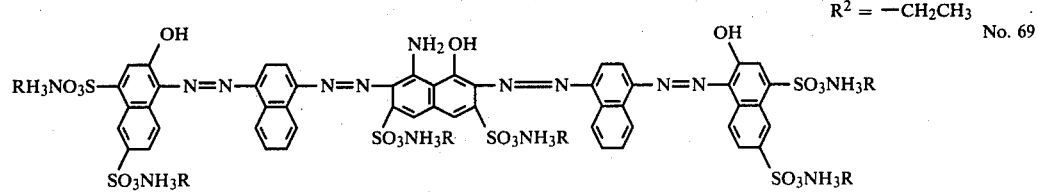
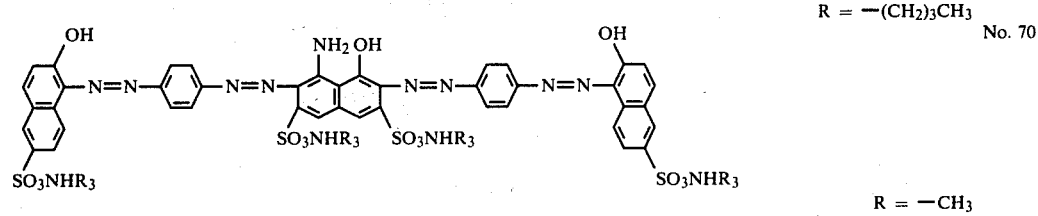
R = —CH$_3$

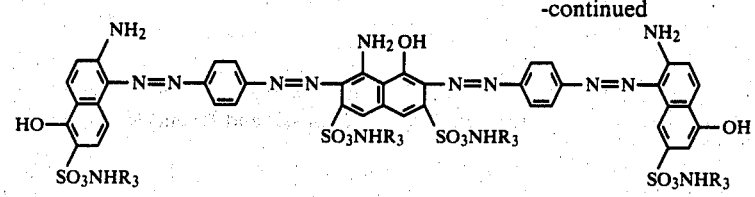
No. 71
R = —(CH$_2$)$_2$CH$_3$
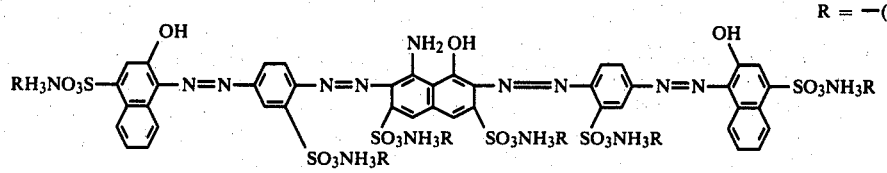
No. 72
R = —CH$_2$—⟨S⟩
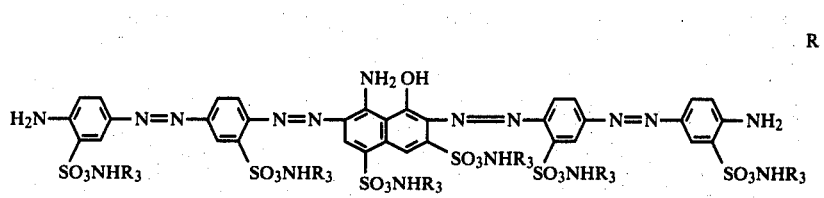
No. 73
R = —CH$_3$
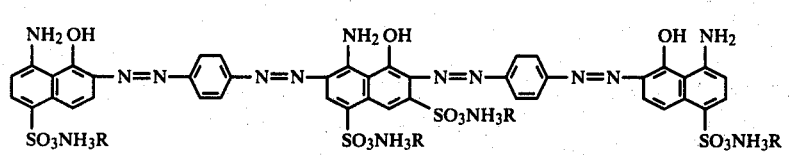
No. 74
R = —(CH$_2$)$_2$CH$_3$
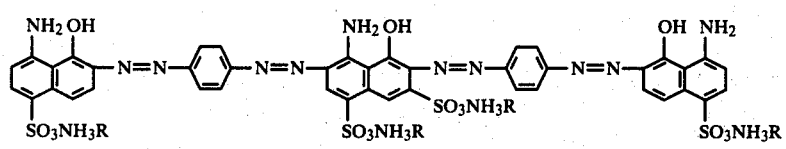
No. 75
R = —CH$_2$CH$_2$OH
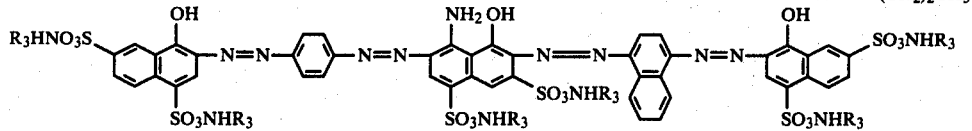
No. 76
R$^1$ = —CH$_3$
R$^2$ = —CH$_2$CH$_3$
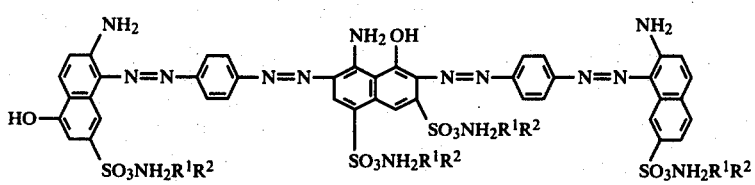
No. 77
R$^1$ = —CH$_2$CH$_2$CH$_3$
R$^2$ = —CH$_2$CH$_3$
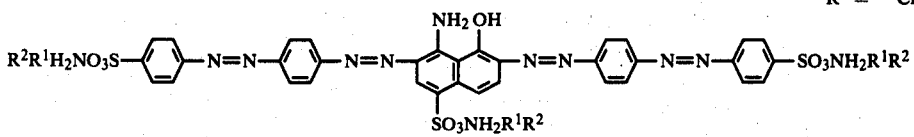
No. 78
R = —(CH$_2$)$_3$CH$_3$
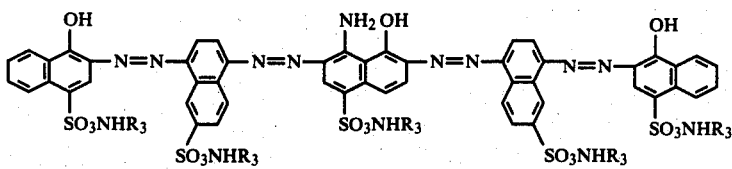
No. 79
R = —CH$_2$CH$_2$OH
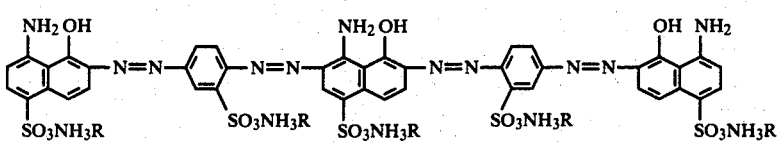
No. 80
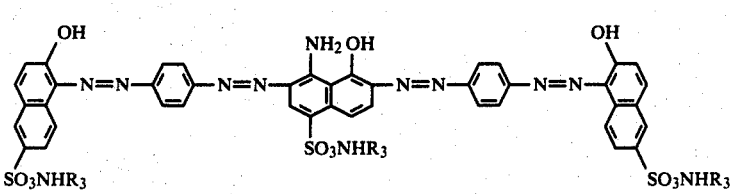

-continued

R = —CH₃

Among the compounds listed above, those compounds whose sulfo groups are present in a form of quaternary ammonium salt exhibit good solution stability when the content of the later described water-soluble organic solvent in the ink composition is relatively high.

Also, among the above-listed dye compounds Nos. 1 through 80, those compounds are preferably used in the present invention which meet the following conditions (a) to (d):

(a) $R_1$ and $R_4$ are sulfo groups in a form of sodium salt or quaternary ammonium salt and $R_2$ and $R_3$ are hydrogen atoms;

(b) $Q_1$ is a phenylene group (unsubstituted or substituted by sulfo group);

(c) $Q_2$ is a phenyl or naphthyl group having substituent(s) such as amino, hydroxyl, etc.; and (d) the number of sulfo groups present in one molecular is 2 to 8 and preferably 2 to 6. To concretely mention by number, they are compounds of 1 to 4, 9 to 12, 21 to 24, 32, 53, 57 to 59, 65, 66, 70 and 71.

(II) Dye compounds of the general formula (B):

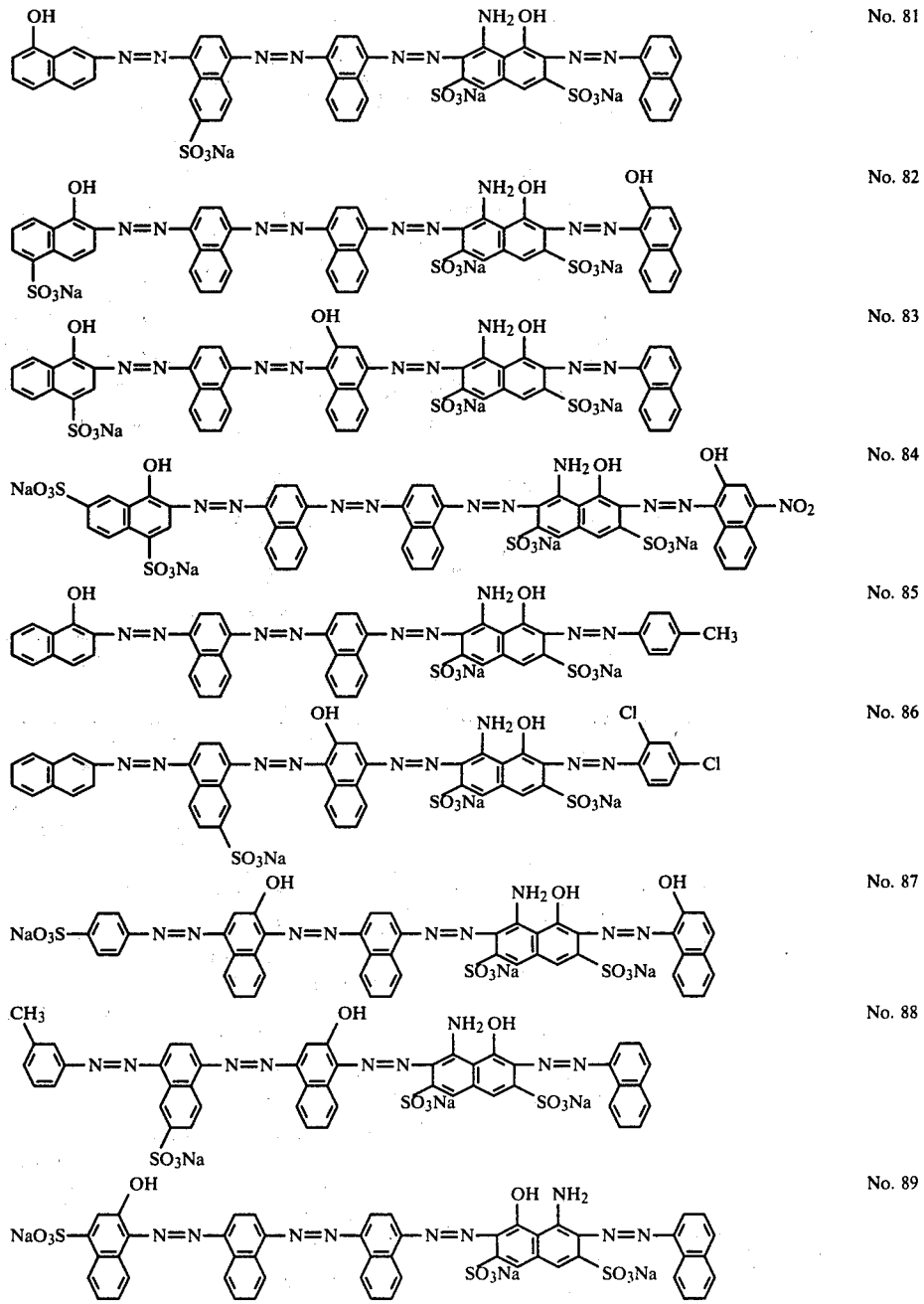

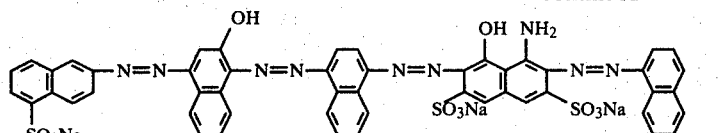 No. 90
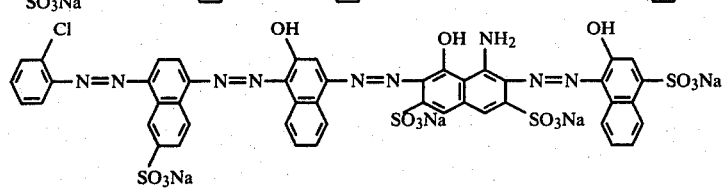 No. 91
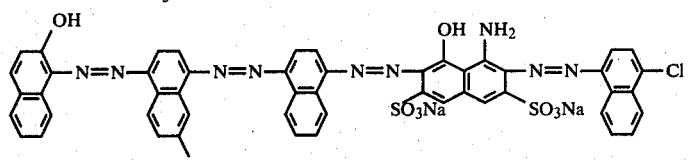 No. 92
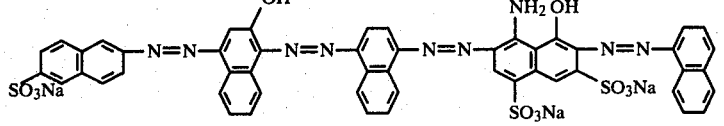 No. 93
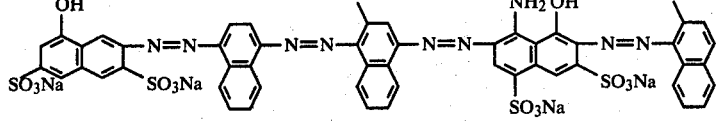 No. 94
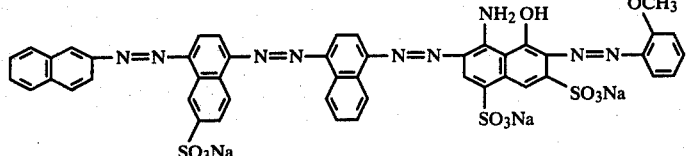 No. 95
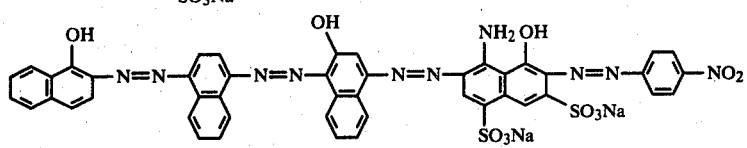 No. 96
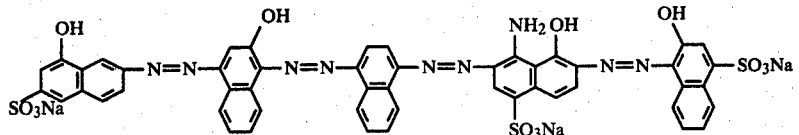 No. 97
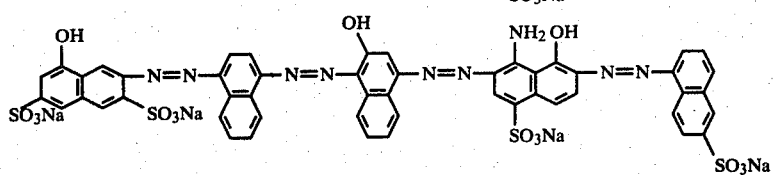 No. 98
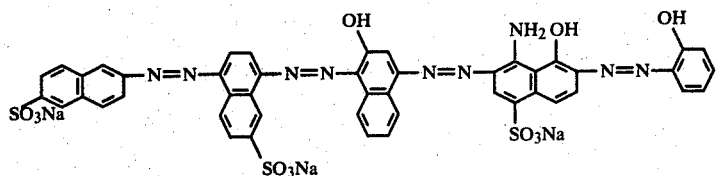 No. 99
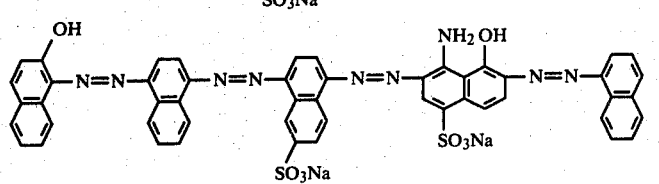 No. 100

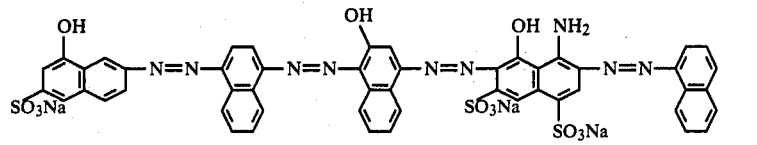 No. 101
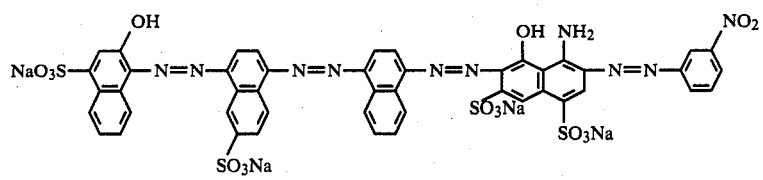 No. 102
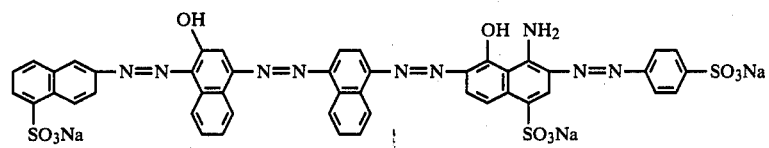 No. 103
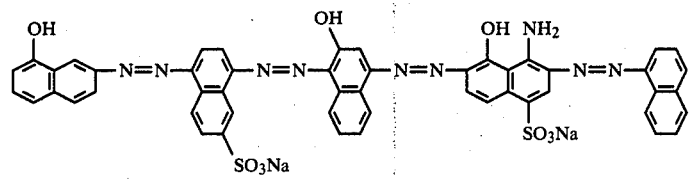 No. 104
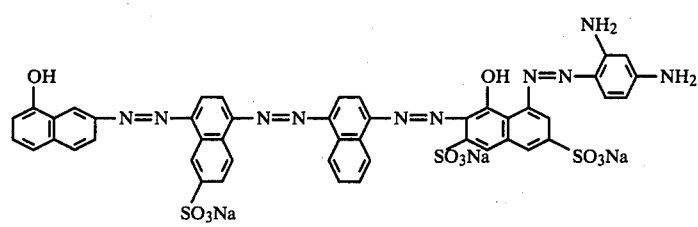 No. 105
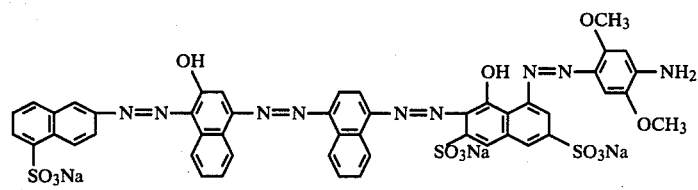 No. 106
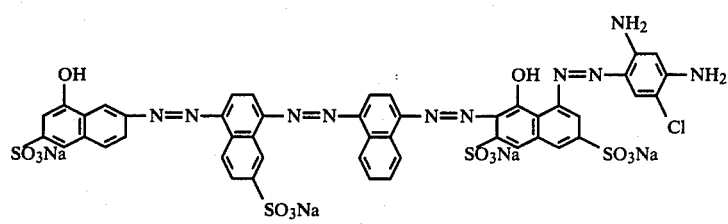 No. 107
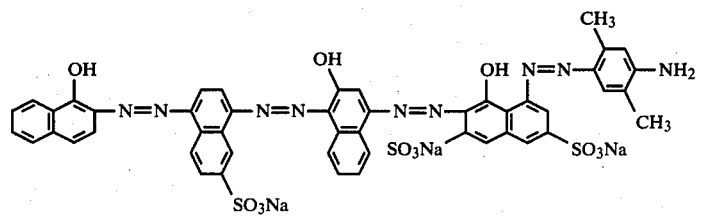 No. 108
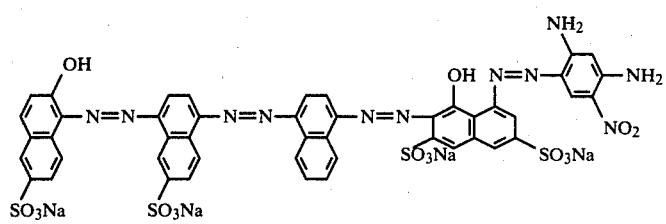 No. 109

-continued
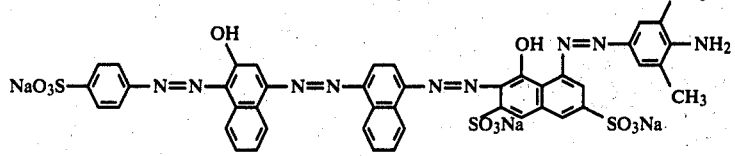 No. 110
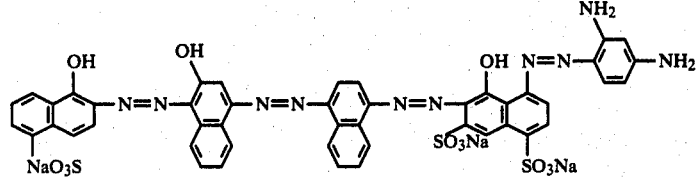 No. 111
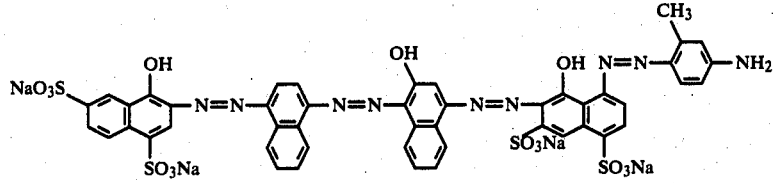 No. 112
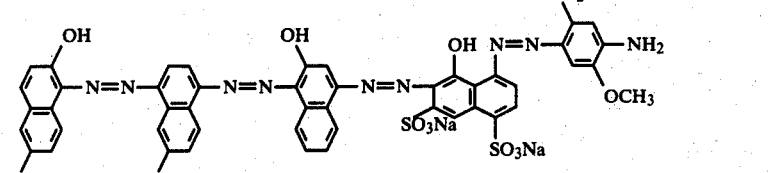 No. 113
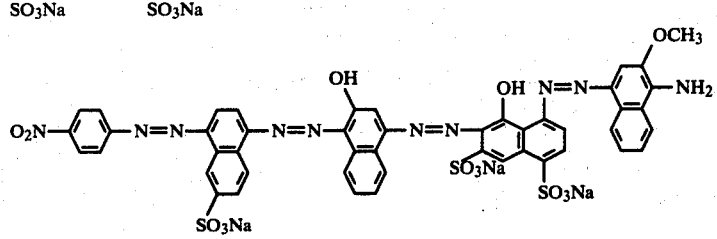 No. 114
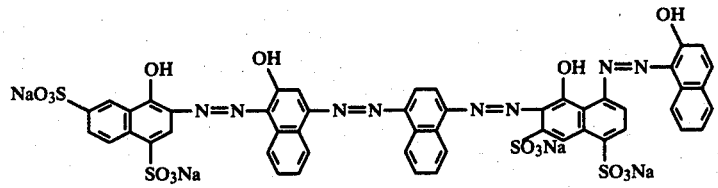 No. 115
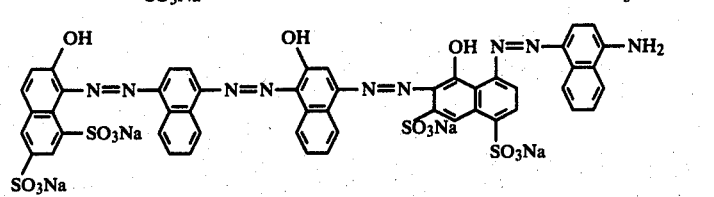 No. 116
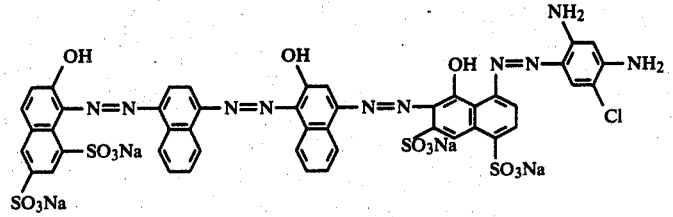 No. 117
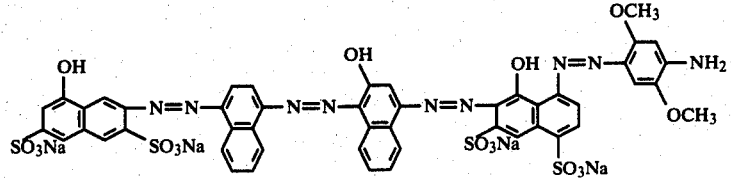 No. 118

-continued
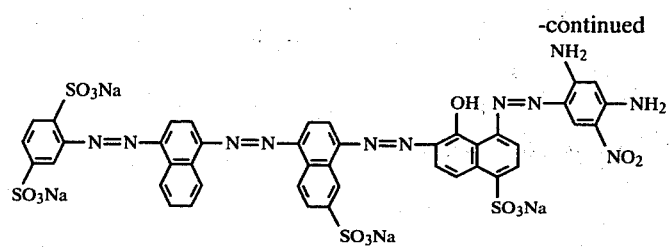
No. 119
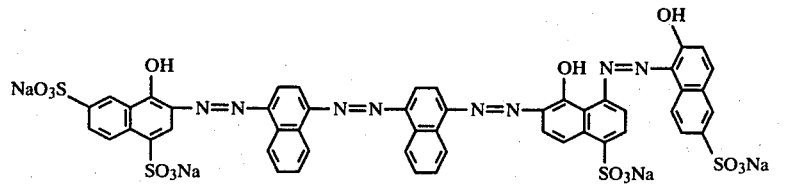
No. 120
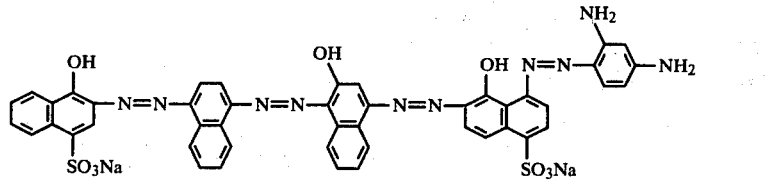
No. 121
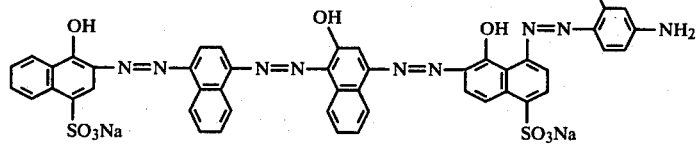
No. 122
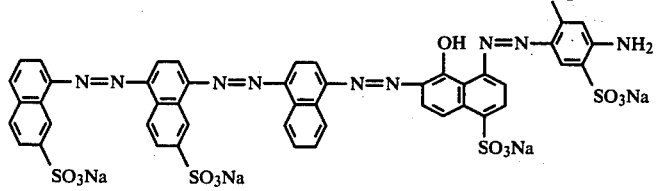
No. 123
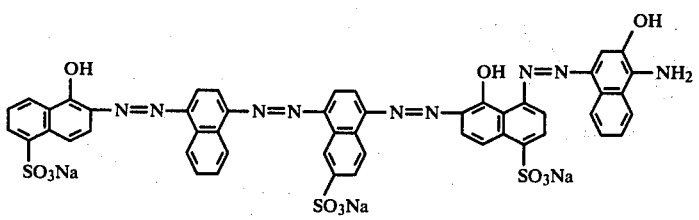
No. 124
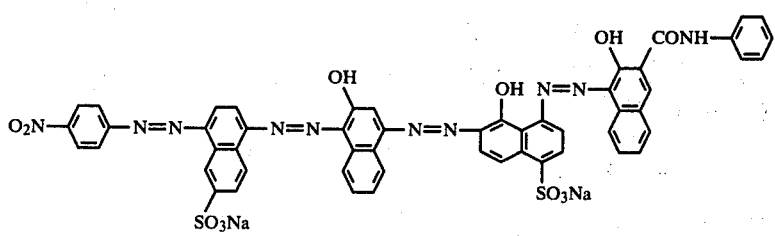
No. 125
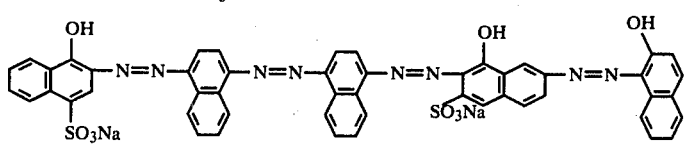
No. 126
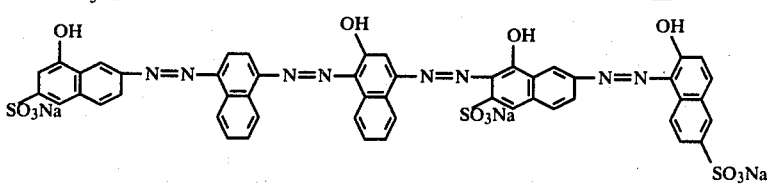
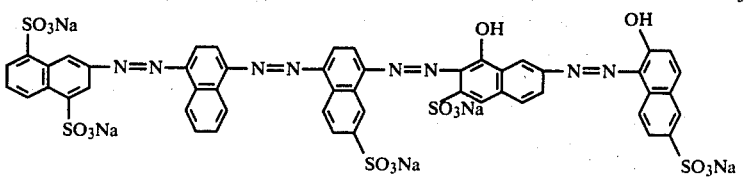
No. 127

-continued
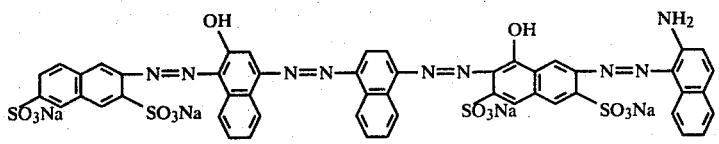 No. 128
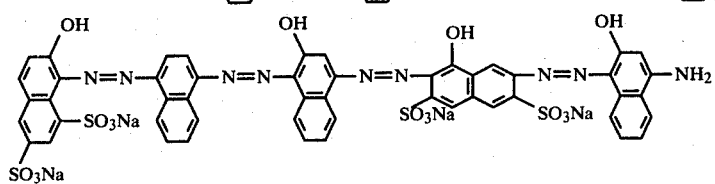 No. 129
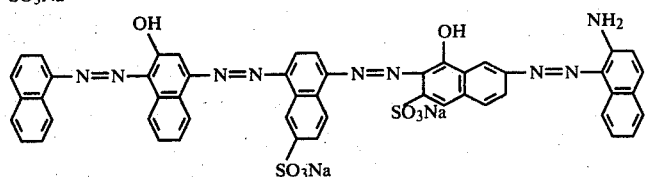 No. 130
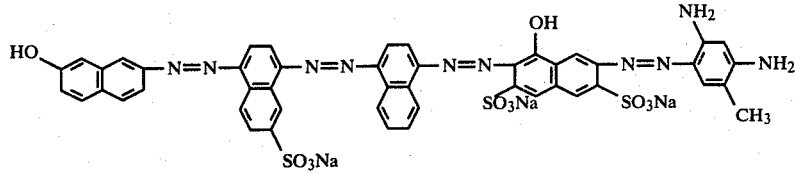 No. 131
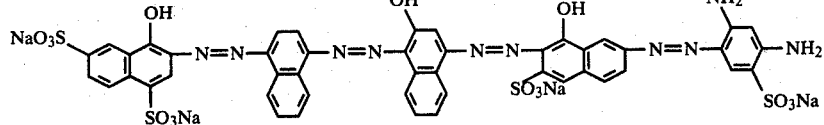 No. 132
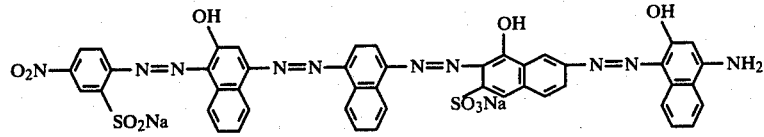 No. 133
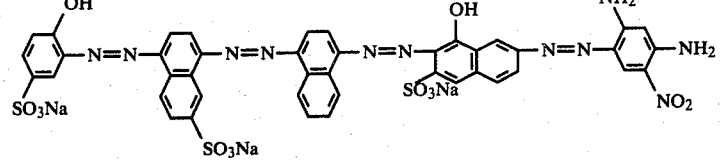 No. 134
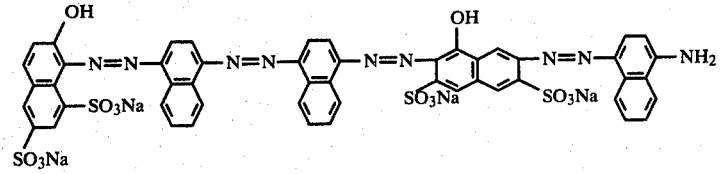 No. 135
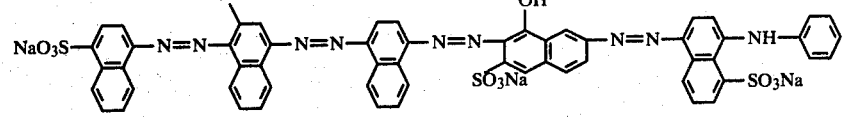 No. 136
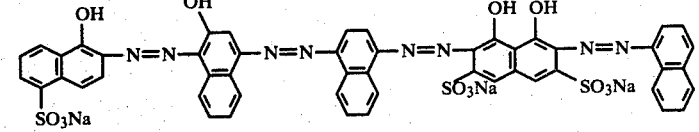 No. 137
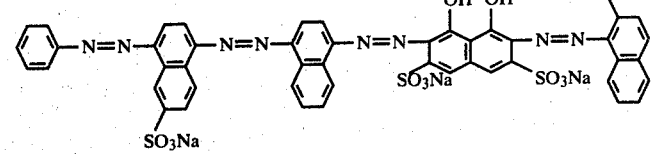 No. 138

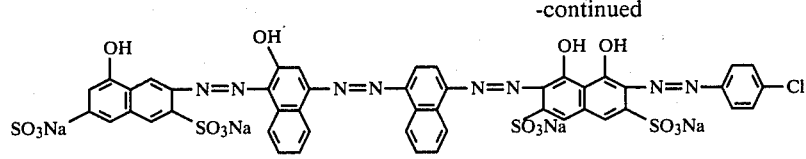
No. 139
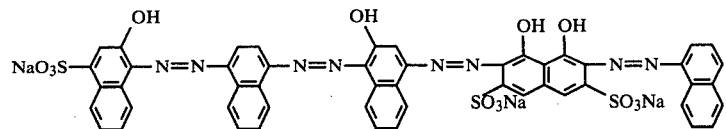
No. 140
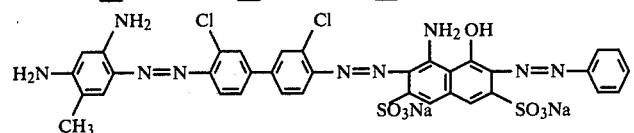
No. 141
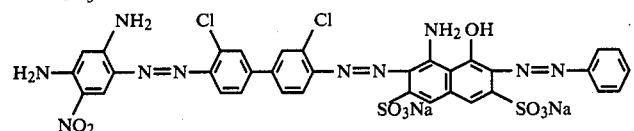
No. 142
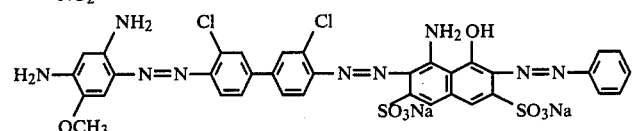
No. 143
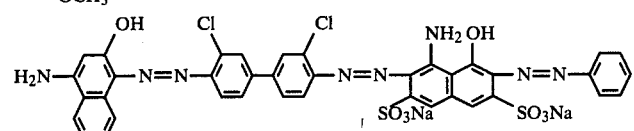
No. 144
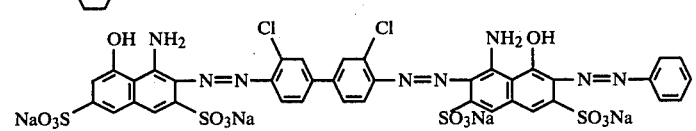
No. 145
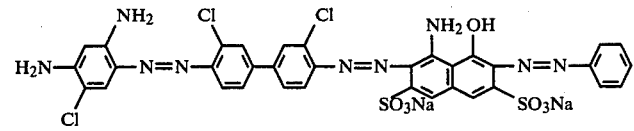
No. 146
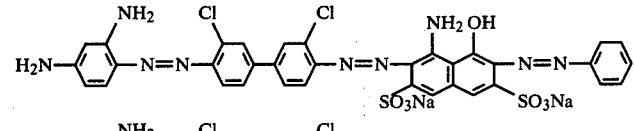
No. 147
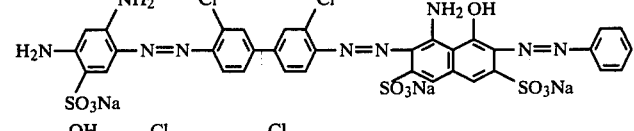
No. 148
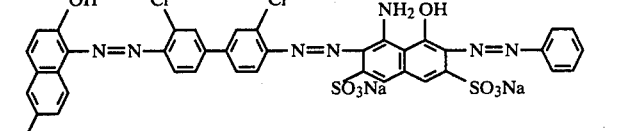
No. 149
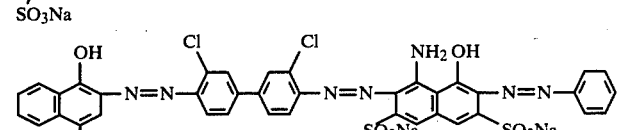
No. 150
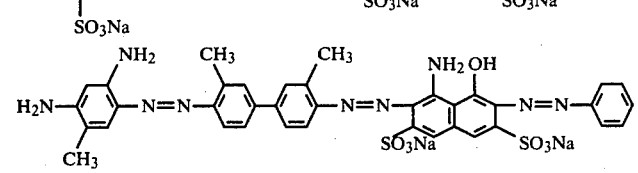
No. 151

-continued

-continued
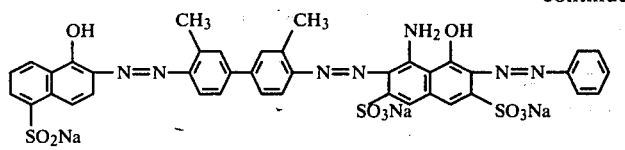 No. 165
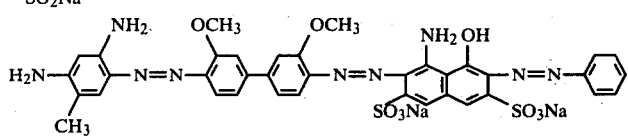 No. 166
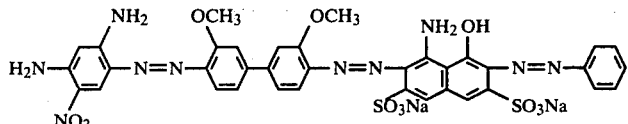 No. 167
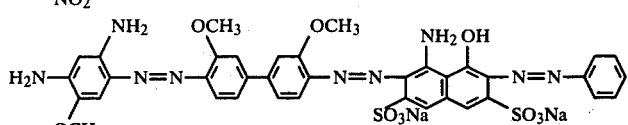 No. 168
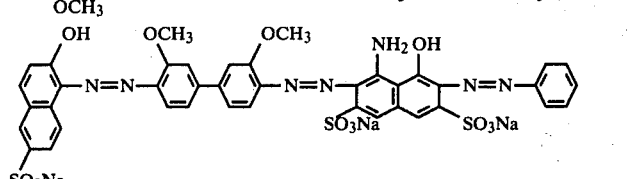 No. 169
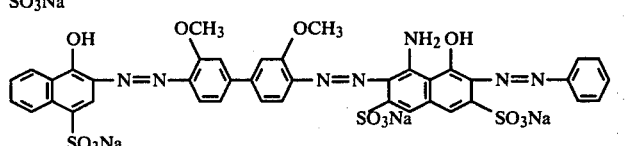 No. 170
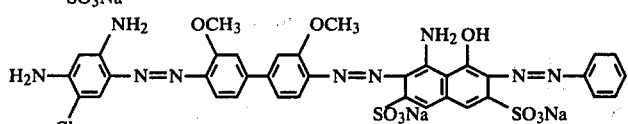 No. 171
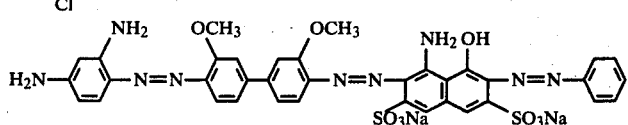 No. 172
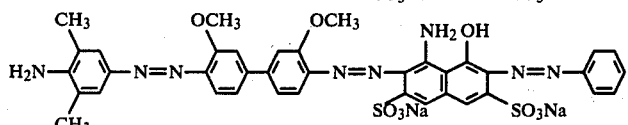 No. 173
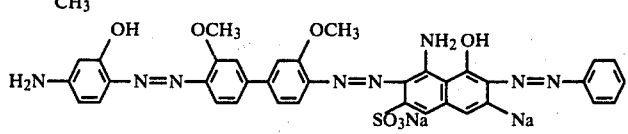 No. 174
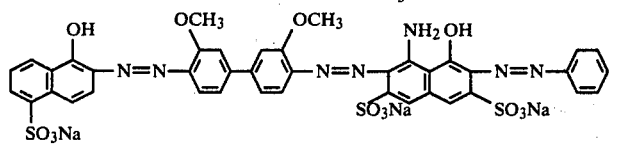 No. 175
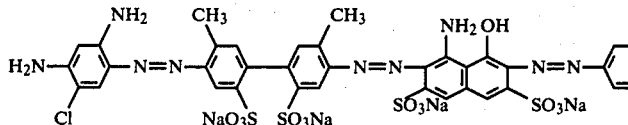 No. 176
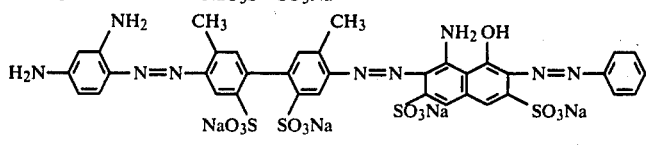 No. 177

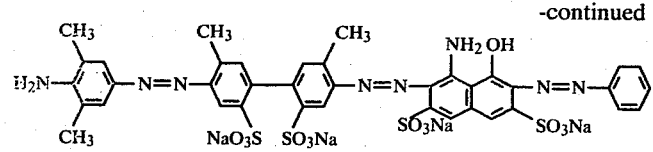
No. 178
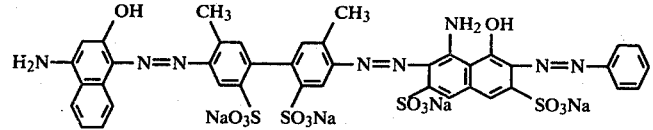
No. 179
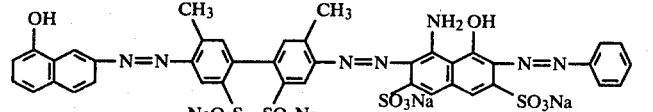
No. 180
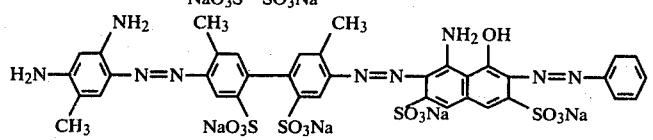
No. 181
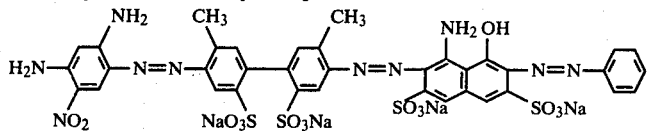
No. 182
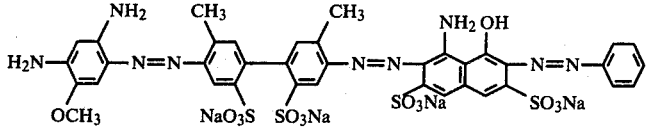
No. 183
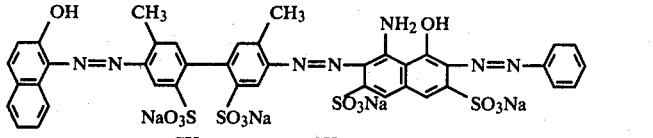
No. 184
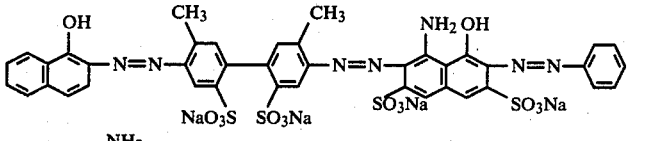
No. 185
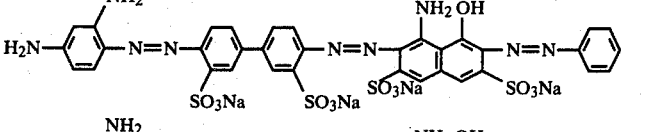
No. 186
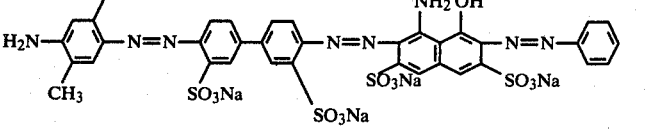
No. 187
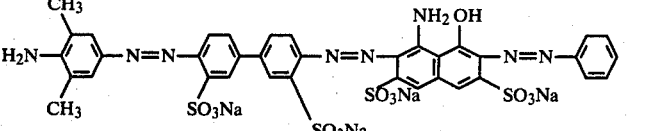
No. 188
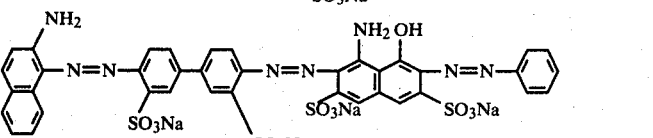
No. 189
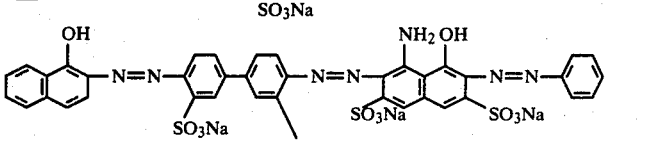
No. 190

-continued
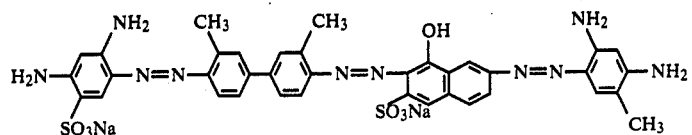 No. 191
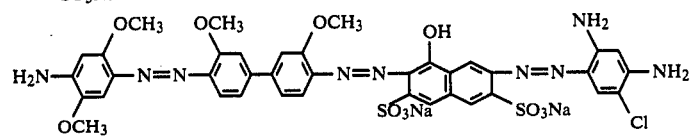 No. 192
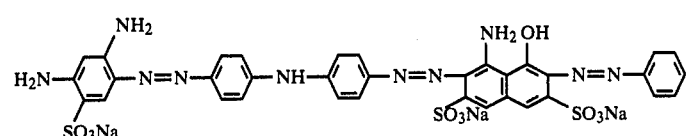 No. 193
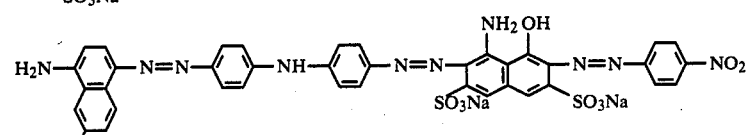 No. 194
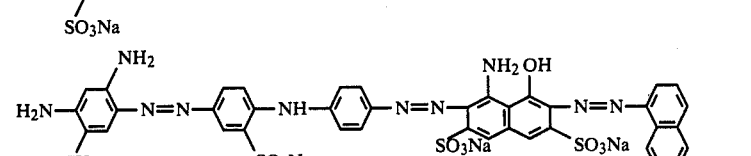 No. 195
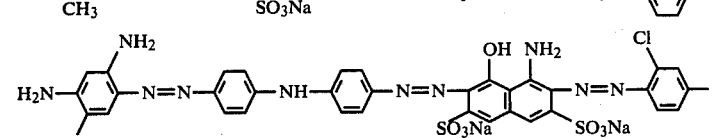 No. 196
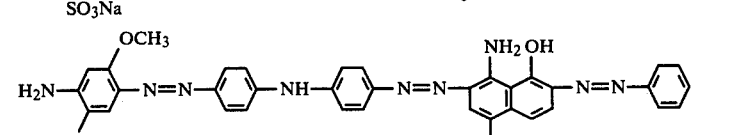 No. 197
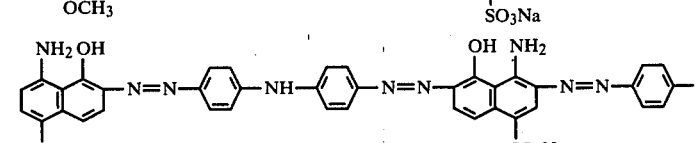 No. 198
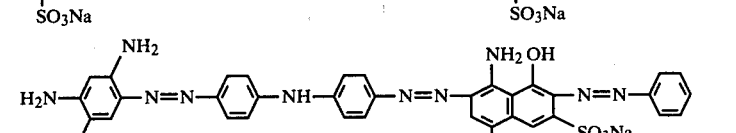 No. 199
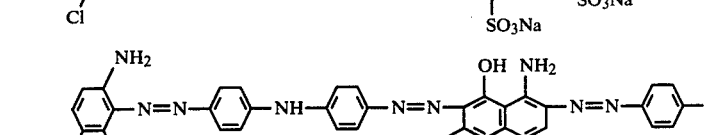 No. 200
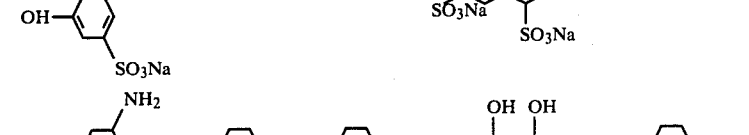 No. 201
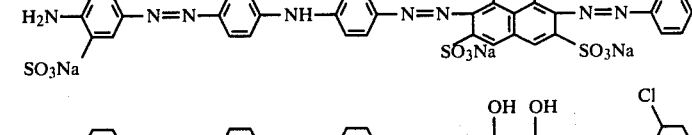 No. 202

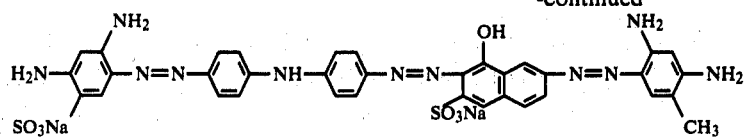 No. 203
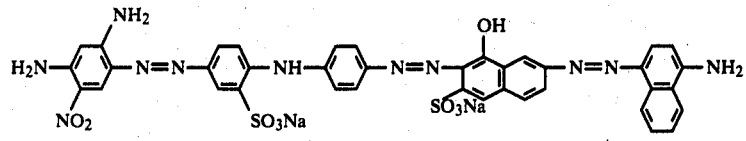 No. 204
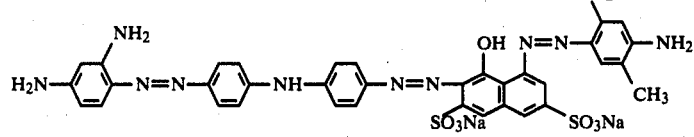 No. 205
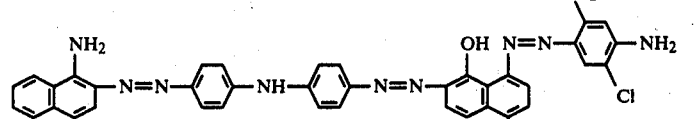 No. 206
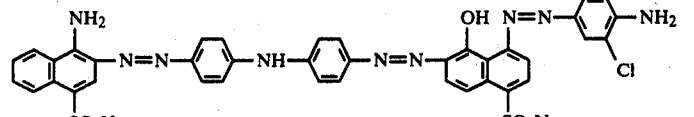 No. 207
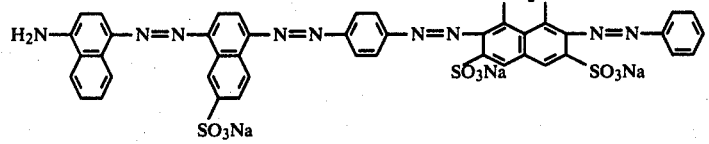 No. 208
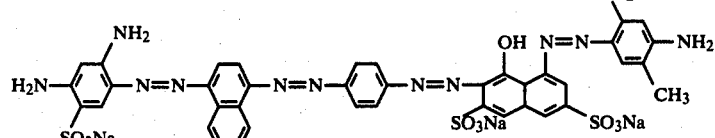 No. 209
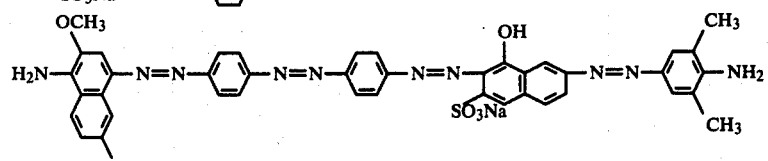 No. 210
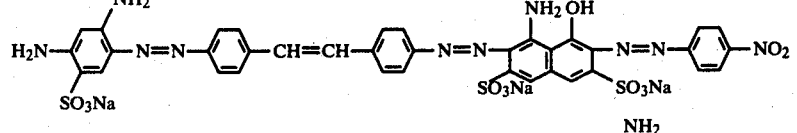 No. 211
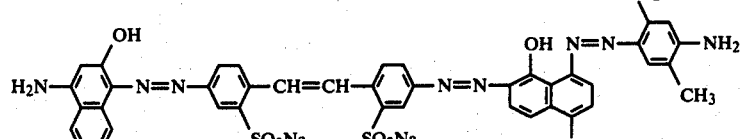 No. 212
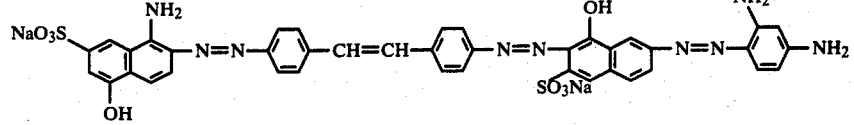
Among the compounds listed above, those compounds which are represented by the following general formula (B)' are preferably used in the invention as water soluble dye:

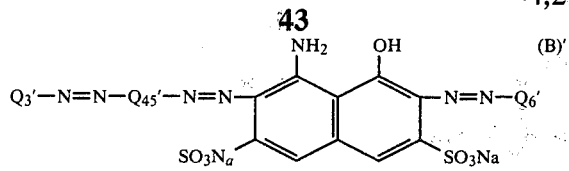

wherein
Q'₃ is a substituted or unsubstituted phenyl or naphthyl group; Q'₄₅ represents a substituted or unsubstituted 4,4'-biphenylene group and Q'₆ represents a substituted or unsubstituted phenyl group.

More preferable compounds are those compounds of the above general formula (B)' in which Q'₃, Q'₄₅ and Q'₆ are substituted by substituents selected from the group consisting of hydroxyl, amino, methoxy, nitro, chloro and sodium sufonate group (SO₃Na) or the like. To concretely mention by number, they are compounds of 141, 143 to 145, 147 to 151, 153 to 155, 157, 159 to 162, 164 to 166, 168 to 170, 172, 174, 175, 177, 179 to 181, 183 to 187, 189 and 190.

The above-mentioned dye compound constitutes one essential component of the recording liquid composition of the invention. As another essential component, the recording liquid composition of the present invention includes a liquid carrier which is primarily water. As the carrier component, it is desirable to use a mixture of water and any one of various water soluble organic solvents.

Examples of the water soluble organic solvent useful for this purpose include: alkyl alcohols each having 1–4 carbon atoms such as methyl alcohol, ethyl alcohol, n-propyl alcohol, isopropyl alcohol, m-butyl alcohol, sec-butyl alcohol, tert-butyl alcohol and isobutyl alcohol; amides such as dimethylformamide and dimethylacetamide; ketones and keto alcohols such as acetone and diacetone alcohol; ethers such as tetrahydrofuran and dioxane; polyalkylene glycols such as polyethylene glycol and polypropylene glycol; alkylene glycols each containing 2–6 carbon atoms in the alkylene moiety such as ethylene glycol, propylene glycol, butylene glycol, triethylene glycol, 1, 2, 6-hexane triol, thiodiglycol, hexylene glycol and diethylene glycol; glycerol; lower alkyl ethers of polyalcohols such as ethylene glycol methyl ether, diethylene glycohol methyl (or ethyl) ether and triethylene glycol monomethyl (or ethyl) ether.

Among them, polyalcohol such as diethylene glycol and lower alkyl ether of polyalcohol such as triethylene glycol monomethyl (or ethyl) ether are preferable water soluble organic solvents.

The content of the above-mentioned water soluble organic solvent in the recording liquid composition of the invention is generally in the range of from 5 to 95 wt %, preferably from 10 to 80 wt% and more preferably from 20 to 50 wt% relative to the total weight of the final liquid composition.

The content of water used at this time may vary in a wide range and can be determined suitably depending upon various factors such as kind of solvent used, composition thereof and the desired physical properties of the final liquid composition. Generally speaking, the content of water is usually in the range of from 10 to 90 wt %, preferably from 10 to 70 wt% and more preferably from 20 to 70 wt% based on the total weight of the final liquid composition.

The liquid composition prepared by using the above described components according to the invention exhibits well-balanced and improved properties in all respects including recording property (signal responsiveness, stability of droplet formation, stability of droplet jet, ability to continuous recording for a long time, stability of droplet jet after a long rest time, etc.), storage stability and fixability to the recording material as well as light-, weather- and water resisting property of the recorded image.

However, these properties of the liquid composition may be further improved by adding some additives as described hereinafter.

Addition of a nitrogen-containing heterocyclic ketone compound to the liquid composition of the invention has an effect to further improve the recording ability, especially the jet stability, jet responsiveness and continuous recording ability and also the sharpness, water resistance, light resistance, weather resistance and abrasion resistance of the recorded image.

As the nitrogen-containing heterocyclic ketone compound, that of 5-member ring such as pyrrolidone or imidazolidone is preferably used. In particular, N-methyl-2-pyrrolidone and 1,3-dimethyl-2-imidazolidinone are very suitable for the purpose of the invention in view of versatility and the desired properties of the recording liquid composition.

The content of this additive, if used, may vary depending upon various factors such as the desired properties of the final liquid recording composition, kind of other components used, etc. However, it is generally in the range of from 2 to 90 wt%, preferably from 3 to 70 wt% and more preferably 3 to 50 wt% based on the total weight of the final liquid composition.

In addition to the recording agent (A) or (B), the liquid composition of the invention may include other dyestuff to further improve the properties of the recording agent itself and of the final recording liquid composition.

When a metal-containing azo dye is used together with the recording agent (A) or (B) constituting one essential component of the recording liquid composition of the invention, the stability in solution of the recording agent in the carrier is remarkedly improved. Moreover, the jet stability is greatly improved so that the trouble of blocking of the jet orifice can be prevented completely even after a long rest time of recording operation. Also, the recorded image obtained with such recording light composition exhibits good resistance to water, light, abrasion and alcohol.

The sum amount of the dye compound (A) or (B) and the metal-containing azo dye and the ratio of the former: the latter may be suitably determined considering various factors such as the desired density of recorded image, the type of the recording apparatus used, kind and amount of other ingredients and the desired physical properties of the final ink composition. Generally, the sum of two dye compounds to be used together is in the range of from 0.5 to 20 wt%, preferably from 0.5 to 15 wt% and more preferably from 1.0 to 10 wt% based on the total weight of the final ink formulation. The ratio by weight of the dye(A) or (B): the metal-containing azo dye is usually in the range of from 9:1 to 1:9 and preferably from 8:2 to 2:8.

Metal-containing azo dyes preferably used in the invention are those ones in which 1 to 3 moleculars of azo dye having, in each molecular, suitable groups such as hydroxyl, carboxyl and amino group are combined with one atom of metal such as copper or chromium.

Examples of such preferable metal-containing azo dye are as follows:

C.I Acid Black 51(C.I 16711), C.I Acid Black 52, (C.I 15711), C.I Acid Black 58, C.I Acid Black 60,
C.I Acid Black 62, C.I Acid Black 64,
C.I Acid Black 107, C.I Acid Black 108,
C.I Acid Black 112, C.I Acid Black 115,
C.I Acid Black 118, C.I Acid Black 119,
C.I Acid Black 121, C.I Acid Black 122,
C.I Acid Black 131, C.I Acid Black 132,
C.I Acid Black 139, C.I Acid Black 140,
C.I Acid Black 155, C.I Acid Black 156,
C.I Acid Yellow 59, C.I Acid Yellow 111,
C.I Acid Yellow 112, C.I Acid Yellow 114,
C.I Acid Yellow 116, C.I Acid Yellow 128,
C.I Acid Yellow 161, C.I Acid Red 183,
C.I Acid Red 184, C.I Acid Red 186,
C.I Acid Red 194, C.I Acid Red 198,
C.I Acid Red 209, C.I Acid Red 211,
C.I Acid Red 215, C.I Acid Red 216,
C.I Acid Red 256, C.I Acid Red 318,
C.I Acid Blue 161, C.I Acid Blue 168,
C.I Acid Blue 170, C.I Acid Blue 171,
C.I Acid Blue 184, C.I Acid Blue 187,
C.I Acid Blue 192, C.I Acid Blue 199,
C.I Acid Blue 229, C.I Acid Blue 234.

As previously mentioned, by using the above metal-containing azo dye and the dye of the general formulas (A) or (B) together as a recording agent component there can be prepared a liquid composition of the invention which has a highly improved solution stability in the carrier used in the invention.

Within the scope of the present invention, the liquid composition may comprise, additionally, a third component serving as a regulator for controlling the physical properties of the recording agent component itself as well as of the final recording liquid composition.

As examples of such third component mention may be made of viscosity controlling agent, surface tension regulating agent, pH controlling agent and specific resistance controlling agent. Also, wetting agent and antimold agent may be added to the recording liquid composition to further improve the composition.

Addition of viscosity regulator and/or surface tension regulator has an effect to ensure the recording liquid to flow through the flowing path in the apparatus at a sufficiently high speed corresponding to the recording speed. It also serves to prevent the recording liquid from flowing into the backside of the jet orifice. Another effect obtainable therefrom is to prevent blurring of the recording liquid on the recording material (prevention of expansion of spot diameter).

As the viscosity regulator and surface tension regulator there may be used any known viscosity regulator and surface tension regulator provided that they are effective for this purpose and have no adverse effect on the carrier as well as the recording agent then used in the recording liquid composition.

Examples of surface tension regulator suitably used in the liquid composition of the invention include anionic and nonionic surface active agents.

If it is necessary for adjusting the surface tension of the final recording liquid composition to a certain desired value, a mixture of two or more surface tension regulators may be used so long as these regulators never adversely affect each other and also other ingredients in the composition.

Addition of pH controlling agent has an effect to further improve the chemical stability of the prepared liquid composition. pH controlling agent, is used, has to be added in an amount sufficient enough to keep the pH of the prepared liquid composition at a certain predetermined level at which no change in physical properties of the liquid composition can occur and deposition or coagulation of the recording agent component and/or other components can be prevented.

In case that droplets of the recording liquid composition are electrified for recording, the electrical chargeability of the liquid composition is very important for good performance of ink jet recording. To assure that droplets of recording liquid can be electrified always suitably for good recording performance, the recording liquid composition must be so prepared as to have a specific resistance usually ranging from $10^{-3}$ to $10^{11}$ $\Omega$cm.

For those recording light compositions which are used without electrification, the value of specific resistance of the recording liquid composition is by no means critical and it may be any value.

Wetting agent may be added alone or as a combination of two or more agents provided that they never adversely affect each other.

Additives as described above are added only when it is desired and they can be added in an amount as required at that time. If it is desired to improve the film forming ability of the ink droplet adhered on the recording material and in particular to improve the film strength, then a water soluble resin polymer also may be added in the recording liquid composition of the invention.

In preparing the recording liquid composition of the invention a particular care should be directed to its viscosity, surface tension and pH value. For the recording liquid composition for use in the type of recording system using electrified ink droplets, care should be directed further to its specific resistance and for such type of recording system using thermal energy, care should be directed further to its specific heat, coefficient of thermal expansion and thermal conductivity. These physical properties are of importance for attaining the effect of the present invention.

These physical properties have close relation with stability of droplet formation, responsiveness and faithfulness to signal, density of image, chemical stability and flowability of the ink composition in the recording apparatus. Therefore, to impart to the recording liquid composition all of the above described recording properties, the recording liquid ink composition of the invention has to be prepared while carefully controlling these physical properties and keeping them in a range specified therefor.

It is desirable that the values of these physical properties be in the range shown in the following Table 1. However, it is not always necessary to satisfy all of the requirements shown in Table 1. In accordance with the type of recording system used and the recording properties required for the recording liquid composition for use in the recording system, selection can be made as to which requirements must be satisfied.

TABLE 1

| Physical property (unit) | Normal | Preferable | Most preferable |
|---|---|---|---|
| Viscosity (20° C.) | | | |

TABLE 1-continued

| Physical property (unit) | Normal | Preferable | Most preferable |
|---|---|---|---|
| (centi poise) | 0.3–30 | 1–20 | 1–10 |
| Surface tension (dyn/cm) | 10–65 | 30–60 | 35–55 |
| pH | 6–12 | 8–11 | |
| *Specific resistance ($\Omega \cdot cm$) | $10^{-3}$–$10^{11}$ | $10^{-2}$–$10^{3}$ | |
| Specific heat (J/gk) | 0.1–4.0 | 0.5–2.5 | 0.7–2.0 |
| Coefficient of thermal expansion ($\times 10^{-3} deg^{-1}$) | 0.1–1.8 | 0.5–1.5 | |
| Thermal conductivity ($\times 10^{-3}$ w/emdeg) | 0.1–50 | 1–10 | |

(*requirement for such ink composition whose droplet is electrified in use)

As previously described, the recording liquid composition of the invention can be used in various types of ink jet recording system by giving to the composition the most suitable physical characteristic values for the recording system then employed.

Figure 2:
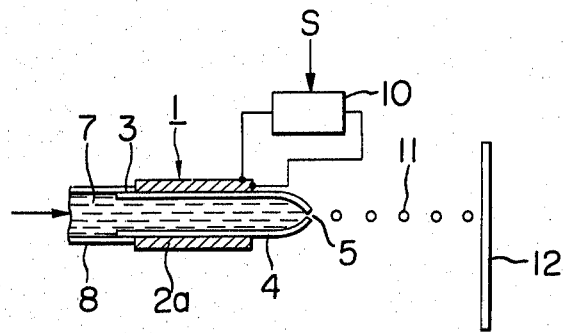

For example, the recording liquid composition of the invention can be used in the recording systems shown in FIGS. 1 and 2. Also, it can be used in such type of ink jet recording system in which ink droplets are produced by electrostatic drawing force or in such type of recording apparatus in which recording signal in a form of thermal energy is applied to the recording liquid composition in the recording head to produce ink droplets.

To further illustrate the invention, the following examples are given.

EXAMPLE 1

| | |
|---|---|
| Ion exchanged water | 67 parts by weight |
| Glycerol | 30 parts by weight |
| Dye No. 153 | 3 parts by weight |

Above three components were thoroughly mixed to form a solution. The resulting solution was filtered through a Teflon filter of $1\mu$ in pore diameter under pressure and then the filtrate was subjected to evacuation treatment by a vacuum pump. Thus, a liquid composition was prepared which is referred to as ink composition (1).

With the ink composition (1) a recording test was conducted to examine the following four points $T_1$–$T_4$. For this test there was used the recording apparatus shown in FIG. 2 (jet orifice diameter: $60\mu$, piezo-oscillator driving voltage: 50 V, and frequency: 10 KHz). Good results were obtained with respect to all of the examined four points as shown below.

($T_1$) Long time preservability of the ink composition:

The ink composition (1) was bottled in a glass container and sealed. Then, it was stored for six months at 0° C. and 40° C. After the storage period, the ink composition (1) was carefully examined. No change was observed in the physical properties of the ink composition as well as in the color tone of the ink. No desposition of insoluble matter was observed in the composition.

($T_2$) Jet stability:

The ink composition was continuously jetted from the jet orifice for 24 hours. Recording was performed with good quality from start to end.

($T_3$) Jet responsiveness:

In one experiment, an intermittent ink jet at intervals of 2 sec. was carried out. In another experiment, an ink jet was carried out after leaving it alone for a month. In both experiments, stable and uniform recording was performed.

($T_4$) Quality of recorded image:

Recorded image had high density and was clear and sharp. Reduction of image density after exposing the recorded image to a room light for three months long was less than 1%. When the record image was dipped in water for one minute, only a very slight blur of image was observed.

EXAMPLES 2–51

In the same manner as in Example 1, a number of ink compositions were prepared and their $T_1$–$T_4$ were examined using the same procedure as in Example 1. Composition of each the prepared ink composition is shown in the following Table 2 in which the number of the bracket after every component is percent by weight.

All of the ink compositions gave good results in respects of recording properties, fixability of recorded image and sharpness of the image.

Especially good results were obtained in Examples 2, 3, 5, 17, 23, 33, 39, 43, 47 and 50.

TABLE 2

| Example No. | Dye No. | Liquid carrier and other components |
|---|---|---|
| 2 | 157 (3) | water (62) ethylene glycol (30) 1,2,6-hexanetriol (5) |
| 3 | 151 (4) | water (61) glycerol (25) triethanolamine (10) |
| 4 | 153 (3) | water (67) diethylene glycol (30) methyl para-hydroxybenzoate (0.1) |
| 5 | 157 (2) | water (68) triethylene glycol monomethyl ether (30) polyoxyethylene nonyl phenol ether (0.1) |
| 6 | 161 (3) | water (72) propylene glycol (20) dimethylformamide (5) |
| 7 | 162 (3) | water (57) ethyl alcohol (10) glycerol (30) sodium dehydroacetate (0.1) |
| 8 | 164 (5) | water (55) ethylene glycol (35) 1,2,6-hexanetriol (5) |
| 9 | 172 (4) | water (41) triethylene glycol (30) triethylene glycol monomethyl ether (25) |
| 10 | 177 (2) | water (73) glycerol (20) triethanolamine (5) |
| 11 | 153 (3) | water (57) triethylene glycol (35) thiodiglycol (5) |
| 12 | 141 (3) | water (76) ethylene glycol (20) lithium chloride (1) |
| 13 | 143 (7) | water (63) triethylene glycol monoethyl ether (20) glycerol (20) |
| 14 | 152 (1) | water (64) ethylene glycol (30) polyethylene glycol #200 (5) |
| 15 | 154 (3) | water (77) diethylene glycol (20) sodium lauryl sulfate (0.1) |
| 16 | 155 (5) | water (80) glycerol (15) sodium omadine* (0.1) |
| 17 | 157 (3) | water (62) |

TABLE 2-continued

| Example No. | Dye No. | Liquid carrier and other components |
|---|---|---|
| 18 | 158 (3) | triethylene glycol monomethyl ether (30) |
|  |  | triethanolamine (5) |
|  |  | water (72) |
| 19 | 159 (8) | glycerol (20) |
|  |  | dimethylformamide (5) |
|  |  | water (62) |
|  |  | diethylene glycol (25) |
|  |  | thiodiglycol (5) |
| 20 | 160 (3) | water (72) |
|  |  | triethylene glycol monomethyl ether (25) |
| 21 | 163 (3) | water (52) |
|  |  | glycerol (30) |
|  |  | diacetone alcohol (15) |
| 22 | 165 (4) | water (56) |
|  |  | ethylene glycol (25) |
|  |  | ethylene glycol monoethyl ether (15) |
| 23 | 166 (2) | water (63) |
|  |  | glycerol (25) |
|  |  | triethylene glycol monoethyl ether (10) |
| 24 | 167 (4) | water (56) |
|  |  | diethylene glycol (30) |
|  |  | triethylene glycol monomethyl ether (10) |
| 25 | 168 (5) | water (55) |
|  |  | propylene glycol (30) |
|  |  | diacetone alcohol (10) |
| 26 | 169 (5) | water (70) |
|  |  | triethylene glycol (20) |
|  |  | thiodiglycol (5) |
| 27 | 170 (3) | water (77) |
|  |  | glycerol (20) |
|  |  | sodium laurylbenzen sulfonate |
| 28 | 175 (4) | water (66) |
|  |  | diethylene glycol (30) |
|  |  | benzyl bromoacetate (0.1) |
| 29 | 179 (8) | water (62) |
|  |  | ethylene/glycol (25) |
|  |  | isopropyl/alcohol (5) |
| 30 | 181 (3) | water (62) |
|  |  | diethylene glycol (30) |
|  |  | 1,2,6-hexanetriol (5) |
| 31 | 183 (4) | water (70) |
|  |  | propylene glycol (25) |
|  |  | lithium perchlorate (1) |
| 32 | 186 (3) | water (62) |
|  |  | ethylene glycol (30) |
|  |  | triethanolamine (5) |
| 33 | 157 (5) | water (65) |
|  |  | glycerol (25) |
|  |  | thiodiglycol (5) |
| 34 | 161 (6) | water (70) |
|  |  | propylene glycol (24) |
| 35 | 164 (2) | water (63) |
|  |  | triethylene glycol monomethyl ether (30) |
|  |  | isopropyl alcohol (5) |
| 36 | 177 (1.5) | water (78) |
|  |  | ethylene glycol (20) |
|  |  | sodium omadinef (0.5) |
| 37 | 147 (2) | water (88) |
|  |  | triethylene glycol (10) |
|  |  | polyoxyethylene lauryl ether (0.1) |
| 38 | 156 (3) | water (67) |
|  |  | triethylene glycol monoethyl ether (25) |
|  |  | polyethylene glycol #200 (5) |
| 39 | 157 (4) | water (60) |
|  |  | propylene glycol (28) |
|  |  | diacetone alcohol (10) |
| 40 | 162 (3) | water (47) |
|  |  | ethylene glycol (50) |
|  |  | salicylanilide (0.1) |
| 41 | 172 (3) | water (47) |
|  |  | diethylene glycol (35) |
|  |  | ethylene glycol monomethyl ether (15) |
| 42 | 186 (1) | water (44) |
|  |  | diethylene glycol (35) |
|  |  | diacetone alcohol (20) |
| 43 | 157 (2) | water (58) |
|  |  | diethylene glycol (30) |
|  |  | triethylene glycol monomethyl ether (10) |
| 44 | 151 (2) | water (68) |
|  |  | ethylene glycol (25) |
| 45 | 177 (6) | triethanolamine (5) |
|  |  | water (59) |
|  |  | glycerol (20) |
|  |  | dioxane (15) |
| 46 | 172 (2) | water (68) |
|  |  | triethylene glycol (30) |
|  |  | sodium benzoate (0.1) |
| 47 | 151 (2) | water (58) |
|  |  | diethylene glycol monoethyl ether (35) |
|  |  | thiodiglycol (5) |
| 48 | 153 (2) | water (58) |
|  |  | ethylene glycol (40) |
| 49 | 162 (2) | water (68) |
|  |  | glycerol (30) |
| 50 | 157 (3) | water (62) |
|  |  | diethylene glycol (35) |
| 51 | 147 (3) | water (72) |
|  |  | glycerol (25) |

*Sodium mercaptopyridine N-oxide

EXAMPLE 52

| | |
|---|---|
| Ion exchanged water | 62 parts by weight |
| Diethylene glycol | 20 parts by weight |
| N-methyl-2-pyrrolidone | 15 parts by weight |
| Dye No. 119 | 3 parts by weight |

Above four components are introduced into a container and mixed thoroughly to form a solution. The resulting solution was filtered through a Teflon filter of $1\mu$ in pore diameter under pressure. The filtrate was subjected to an evacuation treatment by a vacuum pump. Thus, a recording liquid composition was prepared which is hereinafter referred to as ink composition (II).

In the same manner as in Example 1, a recording test was conducted using the recording apparatus shown in FIG. 2 (jet orifice diameter: $60\mu$, piezo-oscillator driving voltage: 50 V, and frequency: 10 KHz) to evaluate $T_1$–$T_4$ of the ink composition (II).

Good results were obtained regarding all of $T_1$–$T_4$ as shown under.

($T_1$) Long time preservability of the ink composition:

The ink composition (II) was bottled and sealed in a glass container. After storing for six months at 0° C. and 40° C., no change was observed in physical properties and in the color tone of the ink composition. No deposition of insoluble matter was observed.

($T_2$) Jet stability:

The ink composition was continuously jetted from the jet orifice for 24 hours. Recording was performed with good quality from start to end.

($T_3$) Jet responsiveness:

In one experiment, an intermittent ink jet at intervals of 2 seconds was carried out. In another experiment, an ink jet was carried out after leaving it alone for a month. In both of the experiments, stable and uniform recording was performed.

($T_4$) Quality of recorded image:

Recorded image was high in density and sharpness. Reduction of density measured after exposing the recorded image to a room light for three months was found to be less than 1%. When the recorded image was dipped in water for minute, blur of image found on the recording material was very slight.

EXAMPLES 53-69

In the same manner as in Example 52, a number of recording liquid compositions were prepared using components shown in the following Table 3 in which the number in ( ) is percent by weight.

TABLE 3

| Example No. | Dye No. | Liquid carrier and other components |
|---|---|---|
| 53 | 157 (5) | water (80)<br>glycerol (15) |
| 54 | 4 (3) | water (67)<br>N-methyl-pyrrolidone (20)<br>diethylene glycol monomethyl ether (10) |
| 55 | 195 (4) | water (36)<br>ethylene glycol (25)<br>ethylene glycol monomethyl ether (35) |
| 56 | 167 (3) | water (76)<br>glycerol (20)<br>polyvinyl alcohol (1) |
| 57 | 82 (3) | water (62)<br>diethylene glycol monomethyl ether (35) |
| 58 | 156 (5) | water (74)<br>triethylene glycol (20)<br>gum arabic (1) |
| 59 | 23 (5) | water (60)<br>diethylene glycol monomethyl ether (35) |
| 60 | 166 (5) | water (65)<br>glycerol (15)<br>diethylene glycol monoethyl ether acetate (15) |
| 61 | 105 (3) | water (75)<br>triethylene glycol (20)<br>gum arabic (2) |
| 62 | 162 (3) | water (62)<br>diethylene glycol monomethyl ether (35) |
| 63 | 89 (3) | water (67)<br>glycerol (15)<br>diethylene glycol monoethyl ether acetate (15) |
| 64 | 163 (3) | water (67)<br>diethylene blycol monomethyl ether (30) |
| 65 | 32 (5) | water (50)<br>N-methyl-2-pyrrolidone (25)<br>ethylene glycol monoethyl ether (20) |
| 66 | 9 (4) | water (71)<br>ethylene glycol (25) |
| 67 | 152 (4) | water (76)<br>N,N-dimethylformamide (20) |
| 68 | 160 (3) | water (72)<br>diethylene glycol (15)<br>diethylene glycol dimethyl ether (10) |
| 69 | 93 (3) | water (77)<br>ethylene glycol (10)<br>ethylene glycol monoethyl ether (10) |

With the above listed ink compositions, recording tests were conducted in the same manner as in Example 52. Good results similar to that of Example 52 were obtained in all of the points of preservability, jet performance and the quality of recorded image. Especially, very sharp and pure black recorded images were obtained in Examples 53, 58, 59, 60, and 65. This is because the solubility of the dyes used in these examples was high and therefore it was allowed to use higher concentration of the dye without losing storage stability of the final ink composition.

EXAMPLE 70

| Dye No. 157 | 3 parts by weight |
|---|---|
| Diethylene glycol | 30 parts by weight |
| 1,3-dimethyl-2-imidazolidinone | 10 parts by weight |
| Ion exchanged water | 57 parts by weight |

Above components were mixed together in a container thoroughly to form a solution. The resulting solution was filtered through a Teflon filter of 1μ in pore diameter under pressure. The filtrate was subjected to an evacuation treatment by a vacuum pump. Thus, a recording liquid composition was prepared which is hereinafter referred to as ink composition (III). With the ink composition (III) a recording test was conducted using a recording apparatus of the type shown in FIG. 2 (jet orifice diameter 65μ, piezoelement driving voltage: 60 V and frequency: 3 KHz) while examining the following points of $T_1$-$T_4$. In every respect, good result was obtained as shown under.

($T_1$) Long time preservability of the ink composition:

The ink composition (III) was bottled and sealed in a glass container and stored for six months at 0° C. and 50° C. At the end of this storage period the ink composition was carefully examined as to whether there occurred any change or not. No deposition of insoluble matter was observed. No change was observed in the physical properties (viscosity, surface tension and pH) of the ink composition as well as in color tone of the ink.

($T_2$) Jet stability:

The ink composition was jetted continuously for 24 hours from the jet orifice. Recording was performed with high quality from beginning to end.

($T_3$) Jet responsiveness:

In one experiment, an intermittent ink jet at intervals of every two seconds was carried out. In another, an ink jet after a month's leaving-alone time was carried out. In both the experiments, stable and uniform recording was performed.

($T_4$) Quality of recorded image:

Recorded image was high in density and in sharpness. Reduction of density measured after exposing the recorded image to a room light for three months was found to be less than 1%. when the recorded image was dipped in water for a minute long, only a very slight blur of image was observed.

EXAMPLES 71-100

In the same manner as in Example 70, a number of ink composition were prepared using components shown in the following Table 4. Also, recording tests were conducted in the same manner as in Example 70 to evaluate their $T_1$-$T_4$. The results were all good. The number in ( ) given after every component indicates the content of the component in percent by weight.

TABLE 4

| Example No. | Dye No. (wt. %) | Liquid carrier and other components (wt %) |
|---|---|---|
| 71 | 53 (3) | N-methyl-2-pyrrolidone (10)<br>ethylene glycol (25)<br>triethanolamine (2)<br>water (60) |
| 72 | 153 (5) | N-methyl-2-pyrrolidone (70)<br>glycerol (10)<br>lithium chloride (1)<br>water (14) |
| 73 | 157 (3) | N-methyl-2-pyrrolidone (30)<br>propylene glycol (30)<br>diacetone alcohol (5)<br>water (32) |
| 74 | 71 (4) | 1,3-dimethyl-2-imidazolidinone (10)<br>diethylene glycol (25)<br>triethylene glycol monomethyl ether (10)<br>isopropyl alcohol (5)<br>water (46) |
| 75 | 158 (6) | 1,3-dimethyl-2-imidazolidinone (5)<br>triethylene glycol (20)<br>thiodiglycol (5) |

TABLE 4-continued

| Example No. | Dye No. (wt. %) | Liquid carrier and other components (wt %) |
|---|---|---|
| | | triethylene glycol monomethyl ether (5) |
| | | water (59) |
| 76 | 57 (2) | 1,3-dimethyl-2-imidazolidinone (10) |
| | | butylene glycol (10) |
| | | triethanolamine (5) |
| | | water (77) |
| 77 | 4 (8) | 1,3-dimethyl-2-imidazolidinone (15) |
| | | glycerol (10) |
| | | lithium chloride (1) |
| | | water (66) |
| 78 | 172 (4) | N-methyl-2-pyrrolidone (20) |
| | | hexylene glycol (10) |
| | | dimethylformamide (5) |
| | | water (61) |
| 79 | 157 (5) | 1,3-dimethyl-2-imidazolidinone (10) |
| | | diethylene glycol (30) |
| | | polyoxyethylene nonyl phenol ether (0.1) |
| | | water (55) |
| 80 | 177 (3) | N-methyl-2-pyrrolidone (30) |
| | | triethylene glycol (20) |
| | | water (47) |
| 81 | 186 (2) | 1,3-dimethyl-2-imidazolidinone (30) |
| | | ethylene glycol (20) |
| | | water (48) |
| 82 | 160 (2) | 1,3-dimethyl-2-imidazolidinone (40) |
| | | diethylene glycol (20) |
| | | water (38) |
| 83 | 166 (3) | N-methyl-2-pyrrolidone (20) |
| | | triethylene glycol monomethyl ether (10) |
| | | diethylene glycol (20) |
| | | water (47) |
| 84 | 157 (4) | N-methyl-2-pyrrolidone (10) |
| | | water (86) |
| 85 | 169 (2) | N-methyl-2-pyrrolidone (5) |
| | | glycerol (20) |
| | | water (73) |
| 86 | 157 (2) | 1,3-dimethyl-2-imidazolidinone (15) |
| | | triethanolamine (5) |
| | | sodium lauryl sulfate (0.1) |
| | | water (78) |
| 87 | 12 (1) | 1,3-dimethyl-2-imidazolidinone (10) |
| | | propylene glycol (30) |
| | | water (59) |
| 88 | 175 (3) | N-methyl-2-pyrrolidone (10) |
| | | glycerol (20) |
| | | water (77) |
| 89 | 189 (4) | 1,3-dimethyl-2-imidazolidinone (5) |
| | | triethylene glycol monomethyl ether (30) |
| | | water (61) |
| 90 | 186 (3) | N-methyl-2-pyrrolidone (20) |
| | | triethylene glycol (20) |
| | | triethylene glycol monomethyl ether (10) |
| | | water (47) |
| 91 | 157 (2) | 1,3-dimethyl-2-imidazolidinone (5) |
| | | ethylene glycol (30) |
| | | water (63) |
| 92 | 190 (3) | N-methyl-2-pyrrolidone (15) |
| | | triethylene glycol monoethyl ether (30) |
| | | thiodiglycol (5) |
| | | water (47) |
| 93 | 24 (2) | 1,3-dimethyl-1-imidazolidinone (20) |
| | | diethylene glycol (20) |
| | | glycerol (5) |
| | | water (53) |
| 94 | 159 (3) | N-methyl-2-pyrrolidone (80) |
| | | glycerol (10) |
| | | water (7) |
| 95 | 161 (2) | 1,3-dimethyl-2-imidazolidinone (70) |
| | | water (28) |
| 96 | 164 (3) | 1,3-dimethyl-2-imidazolidinone (20) |
| | | thiodiglycol (5) |
| | | diacetone alcohol (5) |
| | | water (67) |
| 97 | 168 (3) | 1,3-dimethyl-2-imidazolidinone (30) |
| | | diethylene glycol (20) |
| | | sodium lauryl sulfate (0.1) |
| | | water (47) |
| 98 | 170 (4) | N-methyl-2-pyrrolidone (10) |
| | | glycerol (10) |
| | | ethylene glycol (20) |
| | | water (56) |
| 99 | 181 (2) | 1,3-dimethyl-2-imidazolidinone (5) |
| | | diethylene glycol (30) |
| | | water (63) |
| 100 | 187 (3) | 1,3-dimethyl-2-imidazolidinone (3) |
| | | propylene glycol (10) |
| | | ethylene glycol (20) |
| | | water (64) |

EXAMPLE 101

| | |
|---|---|
| Dye No. 157 | 3 parts by weight |
| Aizen Opal Black BNH | 2 parts by weight |
| (Supplied by Hodogaya Chemicals Co., Ltd., C.I. Acid Black 118) | |
| Diethylene glycol | 30 parts by weight |
| Ion exchanged water | 65 parts by weight |

Above components were mixed together in a vessel thoroughly to form a solution. The resulting solution was filtered through a Teflon filter of 1μ in pore diameter under pressure. Then, the filtrate was evacuated by a vacuum pump. Thus, a recording liquid composition was prepared. This composition is hereinafter referred to as ink composition (IV).

Similarly, two ink compositions (V) and (VI) were prepared using the following components respectively:

| | |
|---|---|
| Ink composition (V) | |
| Dye No. 157 | 5 parts by weight |
| Diethylene glycol | 30 parts by weight |
| Water | 65 parts by weight |
| Ink composition (VI) | |
| Aizen Opal Black BNH | 5 parts by weight |
| Diethylene glycol | 30 parts by weight |
| Water | 65 parts by weight |

To determine the levels of $T_1$–$T_4$ of these three different ink compositions (IV), (V) and (VI) for comparison, recording tests were conducted using a recording apparatus of the type having an on-demand recording head. In this type of recording apparatus, the ink composition is jetted by the action of a piezo-oscillator (jet orifice diameter: 50μ, piezo-oscillator driving voltage: 80 V and frequency: 3 KHz).

The results obtained from the tests were as follows:
($T_1$) Long time preservability of the ink compositions:
Six months' storage at −30° C. and at 60° C.

| Ink Composition | Deposition of insoluble matter | Change in viscosity |
|---|---|---|
| (IV) | none | none |
| (V) | none | none |
| (VI) | none | none |

($T_2$) Jet stability:
Continuous ink jet for 24 hours at room temp., 0° C. and 40° C.

| Ink Composition | |
|---|---|
| | Jet was continued in a stable manner |

-continued

| Ink Composition | |
|---|---|
| (IV) | under all of the temperature conditions used. |
| (V) | Jet was stopped sometimes at 0° C. |
| (VI) | Jet was stopped sometimes at 0° C. |

(T$_3$) Jet responsiveness:
Intermittent jet at intervals of 2 sec. and jet after three months' leaving-alone period.

| Ink composition | Intermittent jet | After three months' leaving-alone period |
|---|---|---|
| (IV) | stable | stable and no clog of jet orifice |
| (V) | stable | stable and no clog of jet orifice |
| (VI) | stable | clogging |

(T$_4$) Quality of recorded image:
: Light resistance (irradiation for 100 hours by a xenon fading metter)
: Water resistance (dipping in water for 24 hours)
: Alcohol resistance (dipping in alcohol for 24 hours)

| Ink Composition | Light resistance | Water resistance | Alcohol resistance |
|---|---|---|---|
| (IV) | no change | no change | no change |
| (V) | no change | almost no change | almost no change |
| (VI) | almost no change | color faded remarkedly | color faded slightly |

As to the ink composition (IV), it was further proved that with the ink composition there can be obtained good result of T$_1$ even after leaving it standing for a long time more than seven months and also good result of T$_3$ even after leaving it standing for a long time more than four months.

EXAMPLES 102–125

According to the same procedure as in Example 101, a number of ink compositions were prepared and tested in respect of T$_1$–T$_4$. Components used for preparing these ink compositions are shown in the following Table 5.

Ink jet was performed in a very stable manner and recorded images were of high quality in all the cases of these ink compositions.

Also, recording tests were conducted using a recording apparatus with an on-demand type multi-head in which ink droplets are generated by applying thermal energy to the ink within the recording head (jet orifice diameter: 35µ, resistance value of heating resistor: 150 Ω, driving voltage: 30 V, and frequency: 2 KHz). Evaluation was made in the same manner as in Example 101. The results were all good.

TABLE 5

| Example No. | Components | Wt. % |
|---|---|---|
| 102 | dye No. 55 | 6 |
| | Aizen Opal Black New Conc | 2 |
| | (C.I. Acid Black 119) | |
| | ethylene glycol | 10 |
| | diethylene glycol | 10 |
| | water | 72 |

TABLE 5-continued

| Example No. | Components | Wt. % |
|---|---|---|
| 103 | dye No. 157 | 10 |
| | Aizen Opal Black 165-5 (Acid Black) | 10 |
| | diethylene glycol | 20 |
| | N-methyl-2-pyrrolidone | 10 |
| | water | 50 |
| 104 | dye No. 32 | 10 |
| | Aizen Opal Black WH | 2 |
| | (C.I. Acid Black 52) | |
| | glycerol | 10 |
| | water | 78 |
| 105 | dye No. 173 | 7 |
| | Lanasyn yellow GLN | 5 |
| | (C.I. Acid Yellow 112) | |
| | propylene glycol | 30 |
| | dioxine | 0.1 |
| | water | 58 |
| 106 | dye No. 157 | 10 |
| | Aizen Opal Black BNH | 3 |
| | propylene glycol | 20 |
| | dioxane | 0.2 |
| | water | 67 |
| 107 | dye No. 141 | 5 |
| | Aizen Opal Black New Conc | 5 |
| | diethylene glycol | 20 |
| | triethylene glycol monomethyl ether | 10 |
| | water | 60 |
| 108 | dye No. 132 | 2 |
| | Aizen Opal Black BNH | 3 |
| | ethylene glycol | 25 |
| | 1,3-dimethyl-2-imidazolidinone | 5 |
| | water | 65 |
| 109 | dye No. 157 | 10 |
| | Kayakalan Black RBL | 6 |
| | (C.I. Acid Black 63) | |
| | diethylene glycol | 20 |
| | thiodiglycol | 5 |
| | water | 59 |
| 110 | dye No. 147 | 1 |
| | Aizen Opal Black BNH | 2 |
| | diethylene glycol | 20 |
| | N-methyl-2-pyrrolidone | 10 |
| | water | 67 |
| 111 | dye No. 151 | 1 |
| | Aizen Opal Black WH | 1 |
| | diethylene glycol | 30 |
| | diacetone alcohol | 15 |
| | triethanolamine | 5 |
| | water | 48 |
| 112 | dye No. 157 | 2 |
| | Kayakalan Black 2RL | 1 |
| | (C.I. Acid Black 155) | |
| | triethylene glycol | 30 |
| | water | 67 |
| 113 | dye No. 4 | 1 |
| | Aizen Opal Black WH | 5 |
| | (C.I. Acid Black 52) | |
| | propylene glycol | 25 |
| | water | 69 |
| 114 | dye No. 65 | 2 |
| | Lanyl Black BG | 2 |
| | (C.I. Acid Black 107) | |
| | triethylene glycol monoethyl ether | 40 |
| | water | 56 |
| 115 | dye No. 21 | 3 |
| | Aizen Opal Black BNH | 4 |
| | triethylene glycol monomethyl ether | 20 |
| | diethylene glycol | 20 |
| | water | 53 |
| 116 | dye No. 193 | 3 |
| | Aizen Opal Black BNH | 3 |
| | triethylene glycol monomethyl ether | 20 |
| | N-methyl-2-pyrrolidone | 10 |
| | water | 64 |
| 117 | dye No. 154 | 2 |
| | Aizen Opal Black 165 | 2 |
| | 1,2,6-hexanetriol | 5 |
| | ethylene glycol | 35 |
| | water | |
| 118 | dye No. 157 | 10 |
| | Aizen Opal Black BNH | 2 |

TABLE 5-continued

| Example No. | Components | Wt. % |
|---|---|---|
| | propylene glycol | 40 |
| | ethanol | 30 |
| | water | 18 |
| 119 | dye 165 | 2 |
| | Aizen Opal Black New Conc | 1 |
| | diethylene glycol | 35 |
| | N-methyl-2-pyrrolidone | 15 |
| | water | |
| 120 | dye No. 177 | 3 |
| | Lanyl Black BD | 1 |
| | triethylene glycol | 20 |
| | water | 76 |
| 121 | dye No. 157 | 2 |
| | Aizen Opal Black BNH | 1 |
| | glycerol | 20 |
| | dimethylformamide | 5 |
| | water | 72 |
| 122 | dye No. 157 | 3 |
| | Aizen Opal Black BNH | 1 |
| | ethylene glycol | 30 |
| | triethanolamine | 5 |
| | water | 61 |
| 123 | dye No. 185 | 4 |
| | Aizen Opal Black BNH | 2 |
| | glycerol | 20 |
| | N-methyl-2-pyrrolidone | 1 |
| | water | 73 |
| 124 | dye No. 59 | 4 |
| | Aizen Opal Black New Cone | 1 |
| | diethylene glycol | 20 |
| | 1,3-dimethyl-2-imidazolidinone | 10 |
| | water | 65 |
| 125 | dye No. 179 | 2 |
| | Kayakalan Black RBL | 2 |
| | ethylene glycol | 25 |
| | isopropyl alcohol | 5 |
| | water | 66 |

"Aizen Opal Black" series are trade names for products supplied by Hodogaya Chemical Co., Ltd.
"Lanasyn Yellow" is a trade name for a product supplied by Mitsubishi Chemical Industries, Ltd.
"Kayakalan Black" series are trade names for products supplied by Nippon Kayaku K.K.
"Lanyl Black" is a trade name for a product supplied by Sumitomo Chemical Co., Ltd.

EXAMPLE 126

In the same manner as described in Example 101, three ink compositions were prepared. Cartridge type fountain pens were charged with these ink compositions (IV), (V) and (VI) respectively. Using the fountain pens, writing was carried out on a medium grade writing paper (trade name "Shirobotan" supplied by Honshu Paper Manufacturing Co., Ltd.). After writing, the water resistance of printed ink was tested. In another experiment, the caps of these fountain pens were put off and the fountain pens uncapped were left alone for 24 hours. After the elapse of 24 hours, writing ability of the fountain pens was tested.

The results were as follows:

TABLE 6

| test | ink composition | | |
|---|---|---|---|
| | (IV) | (V) | (VI) |
| water resistance (dipped in water 5 min. after printing) | good, no blur | good, no blur | blurred to a great extent |
| writing ability after leaving uncapped for 24 hours. | smooth writing possible | smooth writing possible | slightly scratchy |

From the above Table 6, it is clearly seen that the ink compositions (IV) and (V) are excellent in both of water resistance and writing ability after a long leaving-alone time.

From the foregoing it is evident that the present invention can provide highly improved ink compositions as compared with the prior art ones in all respects.

The dye compounds of the general formula (A) may be prepared in accordance with the following procedure:

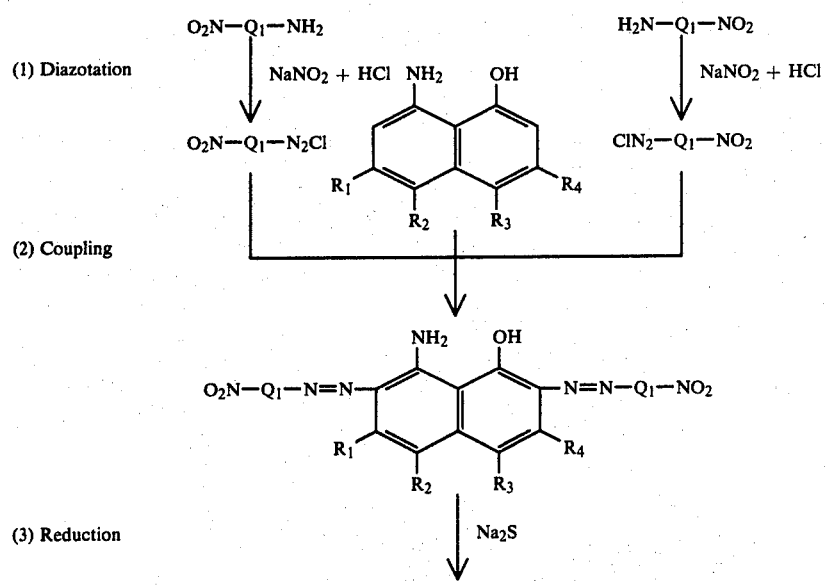

(1) Diazotation (2) Coupling (3) Reduction

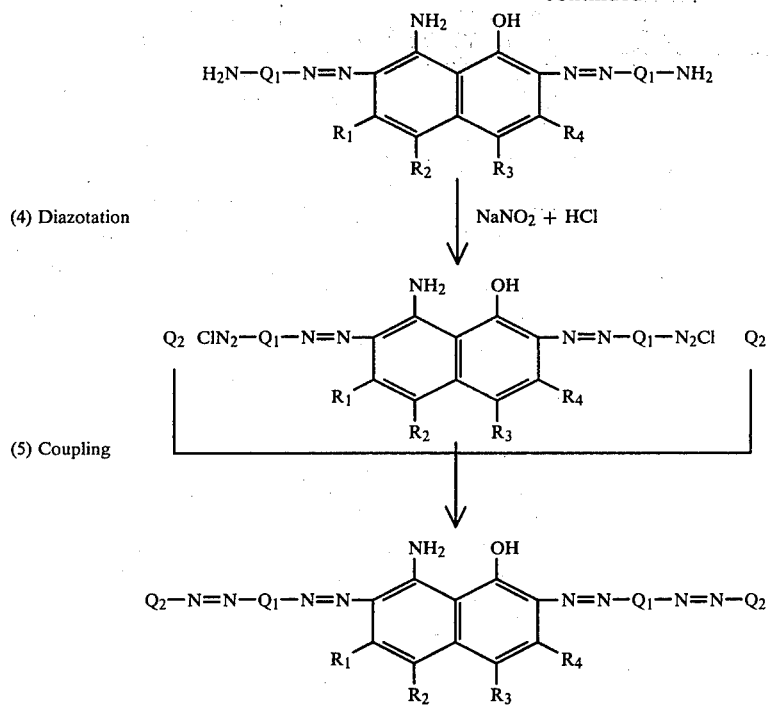

(4) Diazotation (5) Coupling wherein $Q_1$, $Q_2$, $R_1$, $R_2$, $R_3$ and $R_4$ are as defined in the foregoing.

PREPARATION EXAMPLE 1

Dye Compound No. 10

13.8 g of p-nitroaniline (0.1 mol) is dissolved in 60 ml of conc. hydrochloric acid with heating, which is poured into 400 g of ice water with stirring to obtain a yellow suspension. The suspension is cooled with ice, to which a solution of 6.9 g (0.1 mol) of sodium nitrite in 50 ml of water is added. The thus treated suspension is stirred for 15 minutes. Thereafter some little urea is added thereto to decompose the excessive nitrous acid, thereby completing the diazotation.

H-acid (36.8 g, 0.1 mol) is suspended in 400 ml of water, to which an appropriate amount of sodium carbonate is added to form a solution with pH of 5-6. The solution is added to the above-mentioned diazotated liquid at a temperature of 0°-5° C., which is stirred for two hours while a solution of sodium acetate is added to maintain the pH value at about 3. Thereafter, a solution of sodium hydroxide is further added to neutralize or weakly alkalize the mixture.

Additional diazotation of p-nitroaniline is carried out in the same manner as mentioned above. To the resulting liquid is added the mixture as neutralized or weakly alkalized (the pH of 7-9 is maintained), which is stirred for two hours to obtain a blueish black suspension.

The resulting suspension is allowed to stand for one night and then filtered with suction or centrifuged. The thus obtained precipitate is suspended in 500 ml of water, to which a solution of 96 g (0.4 mol) of crystalline sodium sulfide (with $9H_2O$) in 300 ml of water is added. The mixture is stirred at 40° C. for 30 minutes, thereby completing reduction of the nitrogroups. After the mixture is allowed to cool, dark violet precipitate is filtered and collected out of the mixture with suction and added to 500 ml of 4% solution of sodium hydroxide. The resultant is filtered with suction, and 50 ml of hydrochloric acid is then added to the filtrate as separated. Thereafter, blackish violet precipitate is collected by suction filtration. After drying, 53.1 g of the precipitate is obtained with a yield of 80%.

The precipitate is powdered, and 6.62 g (0.01 mol) thereof is dissolved in 100 ml of dilute sodium hydroxide solution, and dilute hydrochloric acid is added to the resulting solution to adjust the pH to 8-9. 1.38 g (0.02 mol) of sodium nitrite is added to the solution, and successively 6 ml of hydrochloric acid is also added at 0°-5° C., which resultant is stirred for 20 minutes, thereby carrying out the diazotation. Some little urea is added to the resultant to decompose the excessive nitrous acid, and the resultant is neutralized with a solution of sodium hydroxide.

A solution of 6.5 g (0.02 mol) of chromatropic acid, i.e. 1,8-dihydroxynaphthalene-3,6-disulfonic acid in 25 ml of a sodium carbonate solution is added to the above-mentioned diazotated suspension at a temperature of 5° C. so that a black suspension is formed (pH 5). The suspension is stirred for two hours and then filtered with suction to obtain the product (9.4 g after drying, total yield of 64%). The maximum absorption wavelength of the product is 480 m$\mu$.

The dye compounds of the formula (B) may be prepared in accordance with the following procedure:

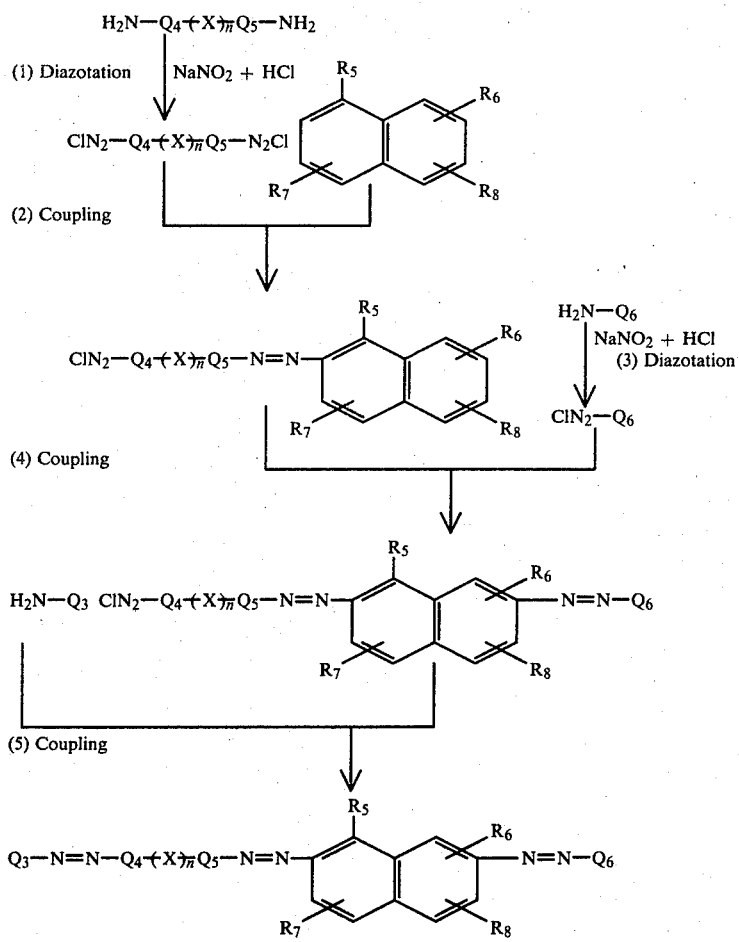

wherein $Q_3$, $Q_4$, $Q_5$, $Q_6$, $R_5$, $R_6$, $R_7$, $R_8$, X and n are as defined in the foregoing.

PREPARATION EXAMPLE 2

Dye Compound No. 147

0.75 g (0.002 mol) of 3,3'-dichlorobenzidine hydrochloride is dissolved in 25 ml of water, to which 12 ml of hydrochloric acid is added to form a suspension. 5 ml of an aqueous solution of 0.28 g (0.004 mol) of sodium nitrite is added to the suspension at 5°–8° C., and the suspension is stirred for about 15 minutes so that a yellow solution is formed. Some little urea is added to the solution, which is stirred for about 15 minutes to decompose the excessive nitrous acid.

A solution of sodium acetate is added to the reaction solution to adjust the pH to 3–4. Thereafter, a liquid of 0.74 g (0.002 mol) of H-acid in 10 ml of a sodium carbonate solution is added to the reaction solution over 1.5 hours at 0°–5° C. so that a dark violet suspension is formed. After the suspension is stirred at pH of 3.5 for 3 hours, a sodium acetate solution and successively sodium hydroxide solution are added to the suspension to adjust the pH to 9.

On the other hand, 10 g of ice water is added to 0.19 g (0.002 mol) of aniline, and 0.6 ml of hydrochloric acid is also added thereto to form a solution. A solution (3 ml) of 0.14 g (0.002 mol) of sodium nitrite is added to the resulting solution, which is stirred for 30 minutes, thereby completing the diazotation. A little amount of urea is then added thereto, and stirring is conducted for 20 minutes. Thereafter, a sodium acetate solution is added to adjust the pH to 4.

The reaction product is combined with the foregoing suspension, the pH value of which mixture is maintained at about 9 with a sodium hydroxide solution. The combined mixture is stirred at 0°–5° C. for two hours. The resultant is allowed to stand in a refrigerator for one night and stirred for 3 hours.

Next, 0.36 g (0.002 mol) of an m-phenylenediamine hydrochloride is dissolved in 5 ml of water, which is neutralized with sodium carbonate. The solution is added to the above-mentioned resultant so that a black suspension is formed. The suspension with pH of 6–7 is stirred for 1.5 hours and the product is collected by the suction filtration. After drying, 1.6 g of the product is obtained with a yield of 99%. The maximum absorption wavelength of the product is 495 m$\mu$.

What we claim is:

1. A recording liquid composition for use in a recording system of the type in which the recording liquid composition is jetted from a small orifice in a form of droplet flying toward a recording material on which an image is to be printed, said recording liquid composition comprising, as its recording agent component, a compound of the general formula (B):

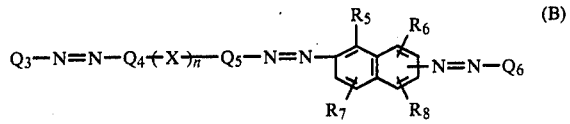

wherein
Q₃ and Q₆ each represents a substituted or unsubstituted phenyl or naphthl group; Q₄ and Q₅ each represents a substituted or unsubstituted 1,4-phenylene or 1,4-naphthylene group;
R₅ and R₆ are selected from hydrogen, hydroxyl and amino group;
R₇ and R₈ each represents hydrogen atom or sulfo group in a form of sodium salt or quaternary ammonium salt;
X is —NH—, —N=N— or —CH=CH— and
n is 0 or 1 provided that when n is 0, Q₄ and Q₅ are not unsubstituted 1,4-phenylene at the same time.

2. A recording liquid composition according to claim 1, wherein the compound represented by the general formula (B) is a compound of the general formula (B)':

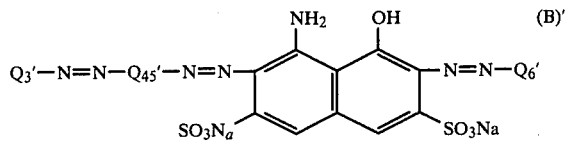

wherein
Q'₃ represents a substituted or unsubstituted phenyl or naphthyl group;
Q'₄₅ represents a substituted 4,4'-biphenylene group; and
Q'₆ represents a substituted or unsubstituted phenyl group.

3. A recording liquid composition according to claim 2, wherein the compound represented by the general formula (B)' is a compound which is substituted, at its Q'₃, Q'₄₅ Q'₆, with groups selected from hydroxyl, amino, nitro, methoxy, chloro and sodium sulfonate group (SO₃Na).

4. A recording liquid composition according to claim 1, wherein said recording agent component is contained in an amount ranging from 0.1 to 20 wt% relative to the total weight of the recording liquid composition.

5. A recording liquid composition according to claim 1, wherein said recording agent component is contained in an amount ranging from 0.5 to 15 wt% relative to the total weight of the recording liquid composition.

6. A recording liquid composition according to claim 1, wherein said recording agent component is contained in an amount ranging from 1 to 10 wt% relative to the total weight of the recording liquid composition.

7. A recording liquid composition according to claim 1, wherein said said composition comprises water as its carrier component.

8. A recording liquid composition according to claim 1, wherein said composition comprises, as its carrier component, a mixture of water and a water soluble organic solvent.

9. A recording liquid composition for use in a recording system of the type in which the recording liquid composition is jetted from a small orifice in a form of droplet flying toward a recording material on which an image is to be printed, said recording liquid composition comprising a nitrogen-containing heterocyclic ketone compound and, as its recording agent component, a compound of the general formula (B):

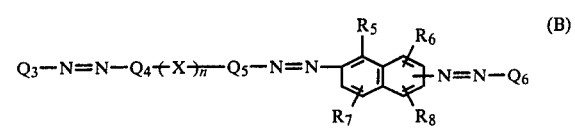

wherein
Q₃ and Q₆ each represents a substituted or unsubstituted phenyl or naphthyl group;
Q₄ and Q₅ each represents a substituted or unsubstituted 1,4-phenylene or 1,4-naphthlyene group;
R₅ and R₆ are selected from hydrogen, hydroxyl and amino group; R₇ and R₈ each represents hydrogen atom or sulfo group in a form of sodium salt or quaternary ammonium salt;
X is —NH—, —N=N— or —CH=CH— and
n is 0 or 1 provided that when n is 0, Q₄ and Q₅ are not unsubstituted 1,4-phenylene at the same time.

10. A recording liquid composition according to claim 9, wherein the content of said nitrogen-containing heterocyclic ketone compound is in the range of from 2 to 90 wt% relative to the total weight of the recording liquid composition.

11. A recording liquid composition according to claim 9, wherein said nitrogen-containing heterocyclic ketone compound is of 5-member ring structure.

12. A recording liquid composition according to claim 9, wherein said nitrogen-containing heterocyclic ketone compound is N-methyl-2-pyrrolidone or 1,3-dimethyl-2-imidazolidinone.

13. A recording liquid composition according to claim 9, wherein the compound represented by the general formula (B) is a compound of the general formula (B)':

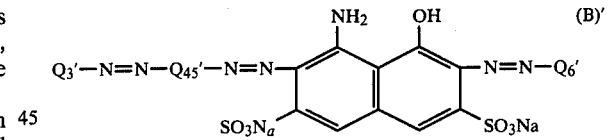

wherein
Q'₃ represents a substituted or unsubstituted phenyl or naphthyl group:
Q'₄₅ represents a substituted 4,4'-biphenylene group; and
Q'₆ represents a substituted or unsubstituted phenyl group.

14. A recording liquid composition according to claim 13, wherein the compound represented by the general formula (B)' is a compound which is substituted, at its Q'₃, Q'₄₅ and Q'₆, with groups selected from hydroxyl, amino, nitro, methoxy, chloro and sodium sulfonate group (SO₃Na).

15. A recording liquid composition according to claim 9, wherein said recording agent component is contained in an amount ranging from 0.1 to 20 wt% relative to the total weight of the recording liquid composition.

16. A recording liquid composition according to claim 9, wherein said recording agent component is contained in an amount ranging from 0.5 to 15 wt% relative to the total weight of the recording liquid composition.

17. A recording liquid composition according to claim 9, wherein said recording agent component is contained in an amount ranging from 1 to 10 wt% relative to the total weight of the recording liquid composition.

18. A recording liquid composition according to claim 9, wherein said composition comprises water as its carrier component.

19. A recording liquid composition according to claim 9, wherein said composition comprises, as its carrier component, a mixture of water and a water soluble organic solvent.

20. A recording liquid composition for use in a recording system of the type in which the recording liquid composition is jetted from a small orifice in a form of droplet flying toward a recording material on which an image is to be printed, said recording liquid composition comprising, as its recording agent component, a compound of the general formula (B)

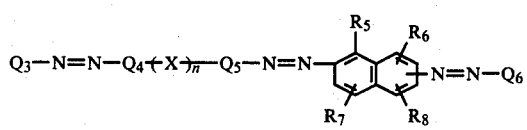

wherein
- $Q_3$ and $Q_6$ each represents a substituted or unsubstaituted phenyl or naphthyl group;
- $Q_4$ and $Q_5$ each represents a substituted or unsubstituted 1,4-phenylene or 1,4naphthylene group;
- $R_5$ and $R_6$ are selected from hydrogen, hydroxyl and amino group;
- $R_7$ and $R_8$ each represents hydrogen atom or sulfo group in a form of sodium salt or quaternary ammonium salt;
- X is —NH—, —N=N— or —CH=CH— and n is 0 or 1 provided that when n is 0, $Q_4$ and $Q_5$ are not unsubstituted 1,4-phenylene at the same time, and a metal-containing azo dye.

21. A recording liquid composition according to claim 20, wherein the ratio by weight of the dye represented by the general formula (B) to the metal-containing azo dye is in the range of from 9:1 to 1:9.

22. A recording liquid composition according to claim 20, wherein the sum content of the dye represented by the general formula (B) and the metal-containing azo dye is in the range of from 0.5% to 20% based on the total weight of the recording liquid composition.

23. A recording liquid composition according to claim 20, wherein the compound represented by the general formula (B) is a compound of the general formula (B)′;

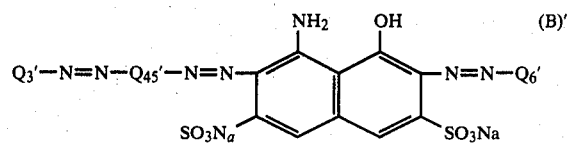

wherein
- $Q'_3$ represents a substituted or unsubstituted phenyl or naphthyl group;
- $Q'_{45}$ represents a substituted 4,4′-biphenylene group; and
- $Q'_6$ represents a substituted phenyl group.

24. A recording liquid composition according to claim 23, wherein the compound represented by the general formula (B)′ is a compound which is substituted, at its $Q'_3$, $Q'_{45}$ and $Q'_6$, with groups selected from hydroxyl, amino, nitro, methoxy, chloro and sodium sulfonate group ($SO_3Na$) or the like.

25. A recording liquid composition according to claim 20, wherein said compound represented by the general formula (B) is contained in an amount ranging from 0.1 to 20 wt% relative to the total weight of the recording liquid composition.

26. A recording liquid composition according to claim 20, wherein said compound represented by the general formula (B) is contained in an amount ranging from 0.5 to 15 wt% relative to the total weight of the recording liquid composition.

27. A recording liquid composition according to claim 20, wherein said compound represented by the general formula (B) is contained in an amount ranging from 1 to 10 wt% relative to the total weight of the recording liquid composition.

28. A recording liquid composition according to claim 20, wherein said composition comprises water as its carrier component.

29. A recording liquid composition according to claim 20, wherein said composition comprises, as its carrier component, a mixture of water and a water soluble organic solvent.

30. In a ink jet recording process for discharging a recording liquid from a discharge orifice in a recording head and spattering said recording liquid in the form of droplets for recording, the improvement which comprises employing a recording liquid comprising a carrier liquid and a compound of the general Formula B as follows:

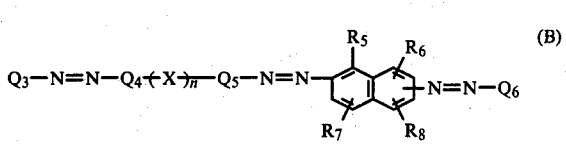

wherein
$Q_3$ and $Q_6$ each represents a substituted or unsubstituted phenyl or naphthyl group; $Q_4$ and $Q_5$ each represents a substituted 1,4-phenylene or 1,4-naphthylene group; $R_5$ and $R_6$ are selected from hydrogen, hydroxyl and amino group; $R_7$ and $R_8$ each represents hydrogen atom or sulfo group in a form of sodium salt or quaternary ammonium salt; X is —NH—, —N=N or —CH=CH— and n is 0 or 1 provided that when n is 0, $Q_4$ and $Q_5$ are not unsubstituted 1,4-phenylene at the same time.

* * * * *

UNITED STATES PATENT AND TRADEMARK OFFICE
CERTIFICATE OF CORRECTION

PATENT NO. : 4,295,889
DATED : October 20, 1981
INVENTOR(S) : EIDA, ET AL.

It is certified that error appears in the above—identified patent and that said Letters Patent is hereby corrected as shown below:

Column 4, line 13, "phnylene" should read --phenylene--.
Column 4, line 15, "apear" should read --appear--.
Column 35-36, Diagram No. 165, "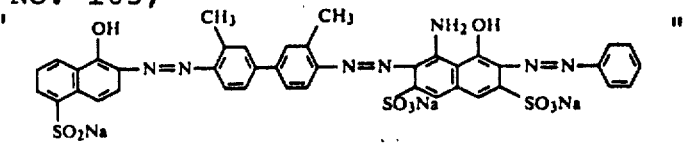"

should be

--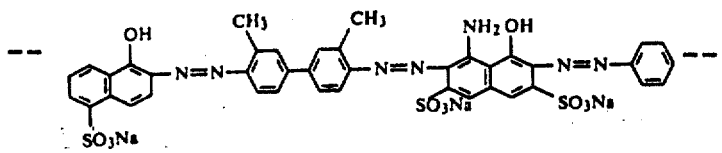--

Column 35-36, Diagram No. 174,

"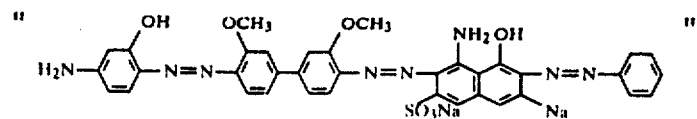"

should be

--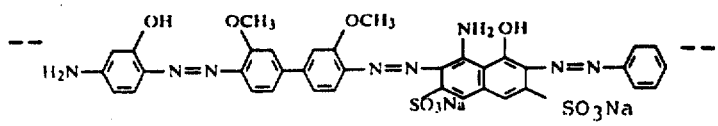--

UNITED STATES PATENT AND TRADEMARK OFFICE
CERTIFICATE OF CORRECTION

PATENT NO. : 4,295,889
DATED : October 20, 1981
INVENTOR(S) : EIDA, ET AL.

It is certified that error appears in the above—identified patent and that said Letters Patent is hereby corrected as shown below:

Column 37-38, Diagram No. 187,

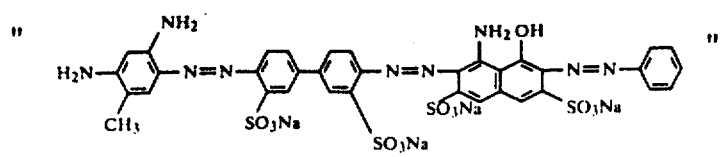

should be

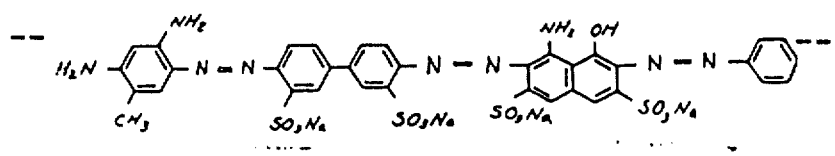

Column 37-38, Diagram No. 188,

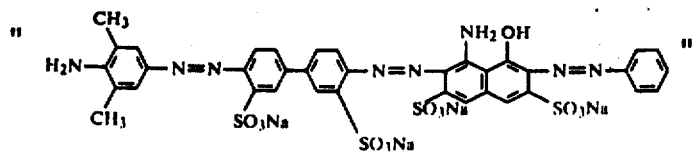

should be

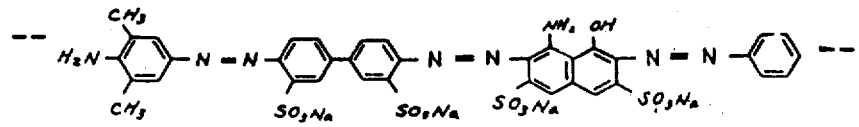

UNITED STATES PATENT AND TRADEMARK OFFICE
CERTIFICATE OF CORRECTION

PATENT NO. : 4,295,889

DATED : October 20, 1981

INVENTOR(S) : EIDA, ET AL.

Page 3 of 6

It is certified that error appears in the above—identified patent and that said Letters Patent is hereby corrected as shown below:

Column 37-38, Diagram No. 189,

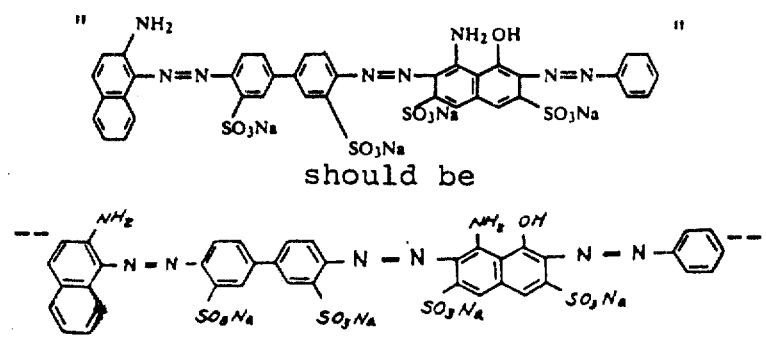

should be

Column 43, lines 1-5,

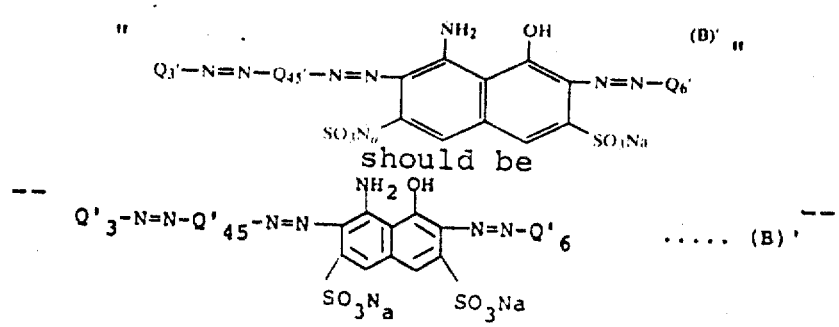

should be

Column 37-38, Diagram No. 190,

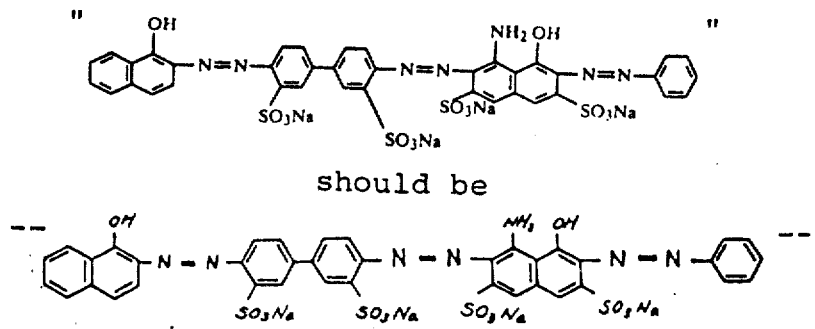

should be

UNITED STATES PATENT OFFICE
CERTIFICATE OF CORRECTION

Patent No. 4,295,889                    Dated October 20, 1981

Inventor(s)    EIDA, ET AL.

It is certified that error appears in the above-identified patent and that said Letters Patent are hereby corrected as shown below:

Column 43, line 16, "sodium sufonate group" should read --sodium sulfonate group--.
Column 46, line 3, "agent, is used" should read --agent, if used,--.
Column 47, line 10, "(_Ω_cm) should read (_Ω_·cm)--.
Column 48, line 19, "composition of each the prepared ink composition" should read --Composition of each of the prepared ink compositions--.
Column 48, line 20, "of the bracket" should read --in the bracket--
Column 49, line 50, "sodium omadinef" should read --sodium omadine--
Column 50, line 66, "for minute" should read --for one minute--.
Column 51, line 37, "diethylene blycol" should read --diethylene glycol--.
Column 55, line 107, "xenon fading metter" should read --xenon fading meter--.
Column 63, line 10, "naphthl" should read -- napthyl --.
Column 63, line 25-30,

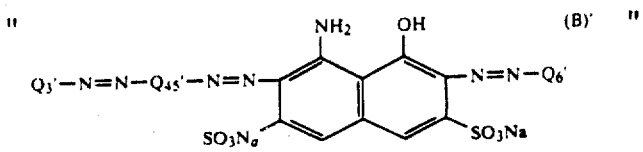

should be

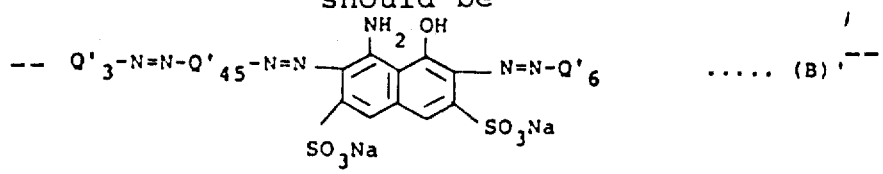

UNITED STATES PATENT OFFICE
CERTIFICATE OF CORRECTION

Patent No. 4,295,889　　　　　Dated October 20, 1981

Inventor(s) EIDA, ET AL.

It is certified that error appears in the above-identified patent and that said Letters Patent are hereby corrected as shown below:

Column 64, line 40-46,

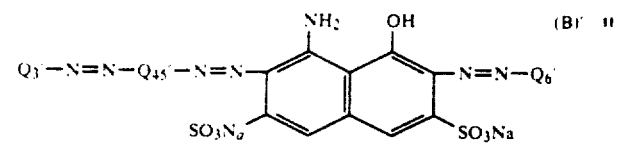

should be

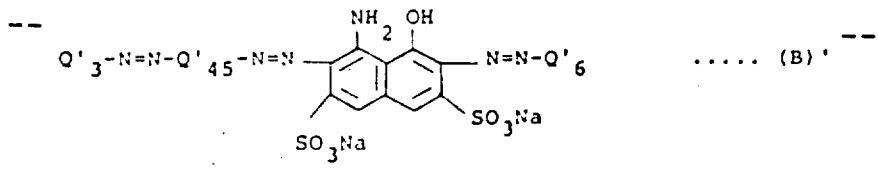

UNITED STATES PATENT AND TRADEMARK OFFICE
CERTIFICATE OF CORRECTION

PATENT NO. : 4,295,889
DATED : October 20, 1981
INVENTOR(S) : EIDA, ET AL.

It is certified that error appears in the above—identified patent and that said Letters Patent is hereby corrected as shown below:

Column 65, line 36, "unsubstaituted" should be --unsubstituted--.
Column 65, line 39, "1,4naphthylene" should read --1, 4-naphthylene--.
Column 66, lines 1-8,

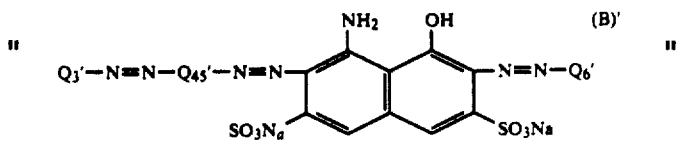

should be

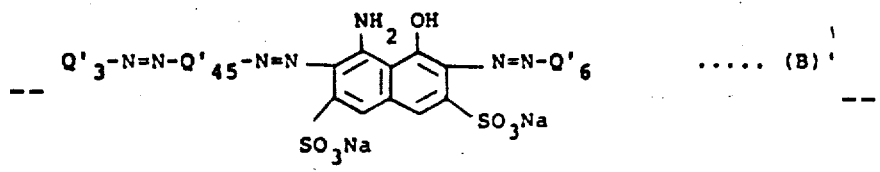

Signed and Sealed this

Sixteenth Day of March 1982

[SEAL]

Attest:

GERALD J. MOSSINGHOFF

Attesting Officer   Commissioner of Patents and Trademarks